(12) United States Patent
Johnson et al.

(10) Patent No.: US 7,535,002 B2
(45) Date of Patent: May 19, 2009

(54) CAMERA WITH VISIBLE LIGHT AND INFRARED IMAGE BLENDING

(75) Inventors: Kirk R. Johnson, Rogers, MN (US); Thomas J. McManus, Plymouth, MN (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 11/625,140

(22) Filed: Jan. 19, 2007

(65) Prior Publication Data

US 2008/0099678 A1 May 1, 2008

Related U.S. Application Data

(63) Continuation-in-part of application No. 11/294,752, filed on Dec. 5, 2005.

(60) Provisional application No. 60/760,810, filed on Jan. 20, 2006, provisional application No. 60/633,078, filed on Dec. 3, 2004.

(51) Int. Cl.
*H01L 25/00* (2006.01)
*G01J 5/02* (2006.01)

(52) U.S. Cl. .................. 250/332; 250/339.05

(58) Field of Classification Search ......... 250/330, 250/332, 335.1, 370.08, 339.05; 348/33
See application file for complete search history.

(56) References Cited

U.S. PATENT DOCUMENTS

| | | | |
|---|---|---|---|
| 4,448,528 A | 5/1984 | McManus | |
| 4,608,599 A | 8/1986 | Kaneko et al. | |
| 4,679,068 A * | 7/1987 | Lillquist et al. | ............... 348/33 |
| 4,751,571 A | 6/1988 | Lillquist | |
| 4,967,276 A | 10/1990 | Murakami et al. | |
| 5,005,083 A | 4/1991 | Grage et al. | |
| 5,140,416 A | 8/1992 | Tinkler | |
| 5,173,726 A | 12/1992 | Burnham et al. | |
| 5,381,205 A | 1/1995 | Kotani et al. | |
| 5,488,674 A | 1/1996 | Burt et al. | |
| 5,534,696 A | 7/1996 | Johansson et al. | |
| H1599 H | 10/1996 | Task et al. | |
| 5,781,336 A | 7/1998 | Coon et al. | |

(Continued)

FOREIGN PATENT DOCUMENTS

EP 0343634 A2 11/1989

(Continued)

OTHER PUBLICATIONS

U.S. Appl. No. 11/294,752, Office Action dated Oct. 18, 2006, 11 pages.

(Continued)

*Primary Examiner*—David P Porta
*Assistant Examiner*—Faye Boosalis
(74) *Attorney, Agent, or Firm*—Fredrikson & Bryon, P.A.

(57) ABSTRACT

A camera that can capture a visible light image and an infrared image of a target scene. The camera includes a focusable infrared lens and a display. The display provides the visible light and infrared images in a focus mode or an analysis mode. In the focus mode, the percentage of infrared imagery of the target scene is relatively higher to assist the user in focusing the infrared image. In analysis mode, the percentage of infrared imagery is relatively lower to assist the user in analyzing and visualizing the target scene. The modes may be switched manually or automatically.

35 Claims, 20 Drawing Sheets

U.S. PATENT DOCUMENTS

| | | | |
|---|---|---|---|
| 5,808,350 | A | 9/1998 | Jack et al. |
| 5,832,325 | A | 11/1998 | Ito et al. |
| 5,910,816 | A * | 6/1999 | Fontenot et al. ............... 348/65 |
| 5,944,653 | A | 8/1999 | Bonnell et al. |
| 5,974,272 | A | 10/1999 | Kiesow et al. |
| 6,009,340 | A | 12/1999 | Hsia |
| 6,020,994 | A | 2/2000 | Cook |
| 6,031,233 | A | 2/2000 | Levin et al. |
| 6,208,459 | B1 | 3/2001 | Coon et al. |
| 6,222,187 | B1 | 4/2001 | Shivanandan |
| 6,232,602 | B1 | 5/2001 | Kerr |
| 6,335,526 | B1 | 1/2002 | Horn |
| 6,370,260 | B1 | 4/2002 | Pavlidis et al. |
| 6,373,055 | B1 | 4/2002 | Kerr |
| 6,417,797 | B1 | 7/2002 | Cousins et al. |
| 6,444,983 | B1 | 9/2002 | McManus et al. |
| 6,449,005 | B1 | 9/2002 | Faris |
| 6,560,029 | B1 | 5/2003 | Dobbie et al. |
| 6,570,156 | B1 | 5/2003 | Tsuneta et al. |
| 6,762,884 | B2 | 7/2004 | Beystrum et al. |
| 6,781,127 | B1 | 8/2004 | Wolff et al. |
| 6,798,578 | B1 * | 9/2004 | Beystrum et al. ............ 359/630 |
| 6,806,469 | B2 | 10/2004 | Kerr |
| 6,849,849 | B1 | 2/2005 | Warner et al. |
| 7,034,300 | B2 | 4/2006 | Hamrelius et al. |
| 7,274,830 | B2 * | 9/2007 | Bacarella et al. ............ 382/276 |
| 2002/0030163 | A1 | 3/2002 | Zhang |
| 2003/0133132 | A1 | 7/2003 | Kiermeier et al. |
| 2004/0001184 | A1 | 1/2004 | Gibbons et al. |
| 2004/0071367 | A1 | 4/2004 | Irani et al. |
| 2004/0169617 | A1 * | 9/2004 | Yelton et al. ................. 345/1.1 |
| 2004/0225222 | A1 | 11/2004 | Zeng et al. |
| 2004/0264542 | A1 | 12/2004 | Kienitz |
| 2006/0208169 | A1 | 9/2006 | Breed et al. |
| 2007/0235634 | A1 * | 10/2007 | Ottney et al. .......... 250/214 VT |

FOREIGN PATENT DOCUMENTS

| | | |
|---|---|---|
| EP | 1339228 A1 | 1/2003 |
| GB | 2389989 A | 12/2003 |
| JP | 11285025 | 10/1995 |
| JP | 10293368 | 11/1998 |
| JP | 11112851 | 4/1999 |
| JP | 2002281491 | 9/2002 |
| JP | 2004072189 | 3/2004 |
| JP | 2005173879 | 6/2005 |
| WO | 2001096824 A1 | 12/2001 |

OTHER PUBLICATIONS

U.S. Appl. No. 11/294,752, Office Action dated Apr. 18, 2007, 8 pages.
U.S. Appl. No. 11/294,752, Office Action dated Jan. 9, 2008, 6 pages.
U.S. Appl. No. 11/294,752, Notice of Allowance dated Sep. 12, 2008, 7 pages.
PCT/US2005/043825, International Search Report and Written Opinion, dated Dec. 15, 2006, 11 pages.
PCT/US2005/043825, International Preliminary Examination Report and Written Opinion, dated Dec. 15, 2006, 8 pages.
EP Application No. 072501968, European Search Report and Opinion dated Mar. 26, 2007, 4 pages.
U.S. Appl. No. 11/294,752, filed Dec. 5, 2005, Notice of Allowance, 9 pages.

* cited by examiner

CAMERA WITH VISIBLE LIGHT AND INFRARED IMAGE BLENDING

PRIORITY CLAIMS

The present application claims priority to U.S. Provisional Patent Application No. 60/760,810, filed Jan. 20, 2006, the disclosure of which is herein incorporated by reference in its entirety. The present application is a continuation-in-part of co-pending U.S. patent application Ser. No. 11/294,752, filed Dec. 5, 2005, which in turn claims priority to U.S. Provisional Patent Application No. 60/633,078, filed Dec. 3, 2004, this disclosures of which are herein incorporated by references in their entirety.

BACKGROUND

Many infrared cameras today produce an image (IR image) of a scene using only energy in the far-infrared portion of the electromagnetic spectrum, typically in the 8-14 micron range. Images obtained using these cameras assign colors or gray-levels to the pixels composing the scene based on the intensity of the IR radiation reaching the camera's sensor elements. Because the resulting IR image is based on the target's temperature, and because the colors or levels displayed by the camera do not typically correspond to the visible light colors of the scene, it can be difficult, especially for novice users of such a device, to accurately relate features of interest (e.g. hot spots) in the IR scene with their corresponding locations in the visible-light scene viewed by the operator. In applications where the infrared scene contrast is low, infrared-only images may be especially difficult to interpret.

An infrared scene is a result of thermal emission and, not all, but most infrared scenes are by their very nature less sharp compared to visible images which are a result of reflected visible light. For example, considering an electric control panel of an industrial machine which has many electrical components and interconnections, the visible image will be sharp and clear due to the different colors and well defined shapes. The infrared image may appear less sharp due to the transfer of heat from the hot part or parts to adjacent parts.

When panning an area with an infrared camera looking for hot or cold spots, one can watch the camera display for a visible color change. However, sometimes the hot or cold spot may be small and the color change may go unnoticed. To aid in the identification of hot or cold spots, infrared cameras often indicate the hot spot or cold spot location via a visible cursor or other graphical indicator on the display. The temperature of such hot spots, calculated using well-known radiometric techniques (e.g., establishing or measuring a reference temperature), is often displayed nearby the cursor. Even with the color change and the hot spot indications, it can be difficult to accurately relate the hot spot (or other features of interest) in the camera display's IR imagery with their corresponding locations in the visible-light scene viewed by the operator.

To address this problem of better identifying temperature spots of interest, some cameras allow the operator to capture a visible-light image (often called a "control image") of the scene using a separate visible light camera built into the infrared camera. The FLIR ThermaCam® P65 commercially available from FLIR Systems of Wilsonville, Oreg. is an example of such a camera. These cameras provide no capability to automatically align, or to merge the visible-light and infrared images in the camera. It is left to the operator to manually correlate image features of interest in the infrared image with corresponding image features in the visible-light image.

Other infrared temperature measurement instruments may employ either a single temperature measurement sensor, or a very small number of temperature sensors arrayed in a grid pattern. Single point instruments typically provide a laser pointing system to identify the target area by illuminating the point or area viewed by the single temperature sensor element, e.g. Mikron M120 commercially available from Mikron Infrared Inc. of Oakland, N.J. Alternatively, some systems employ an optical system that allows the user to visually identify the point in the target scene that is being measured by the instrument by sighting through an optical path that is aligned with the temperature sensor, e.g. Mikron M90 commercially available from Mikron Infrared Inc. of Oakland, N.J. Instruments with more than one sensor element typically provide a very crude infrared image made up of a small number of scene pixels, each with a relatively large instantaneous field of view (IFOV), e.g. IRISYS IRI 1011 commercially available from Advanced Test Equipment of San Diego, Calif. It can be very difficult to accurately identify features of interest using such images.

It is often difficult to focus infrared images because the infrared images do not typically have sharp resolution. For example, because of heat transfer by multiple processes from hot locations to adjoining locations, the images do not always have sharp resolution. This makes focusing the infrared image user subjective. It is desirable to make the focusing of infrared images less subjective.

SUMMARY

Certain embodiments of this invention combine a video-rate and/or still infrared camera, with a video-rate and/or still visible-light camera in one instrument so that the scene can be simultaneously viewed and recorded in both visible-light and infrared. The two images are registered (corrected for parallax error) and sized to match each other, so that the infrared scene and the visible scene overlay each other in the resulting image. The operator can choose to view the infrared image, the visible light image, or an alpha-blended (fused) combination of the two. Because the two images are matched by the camera, the operator can easily correlate features of interest in the infrared and visible light images simply by noting where the features of interest overlap in the two images. Novices may choose to view only the visible-light image and read temperatures in the visible image using data from the not displayed, but associated infrared image.

Certain embodiments of the invention provide a method of displaying visible light (VL) images and/or infrared (IR) images. The method includes providing a camera having a VL camera module, an IR camera module, and a display. The VL camera module and IR camera modules have respective first and second fields of view (FOVs). The method includes focusing the IR camera module on a target scene to create a focused second FOV. The focusing of the IR camera module registers at least a portion of the first FOV corresponding to the focused second FOV with the second FOV. The method also includes displaying an image of either the registered first FOV, the focused second FOV, or a blended image of the registered first FOV and the focused second FOV.

Certain embodiments of the invention provide a method of displaying visible light (VL) images and/or infrared (IR) images. The method includes providing a VL camera module, an IR camera module, and a display. The VL camera module and IR camera modules have respective first and second fields of view (FOVs) and produce images of the respective FOVs. The method includes displaying at least portions of the images on the display. The method also includes registering the images from the VL camera module and the IR camera module on the display by displacing the images relative to each other until they are registered via the use of a manual adjustment mechanism.

Certain embodiments of the invention include a camera that produces visible and infrared images. The camera comprises a visible camera module having a VL sensor and VL optics and an IR camera module having an IR sensor and IR optics. The VL camera module is displaced from the IR camera module so that the modules see a target scene from different views causing a parallax error. The camera can include means for correcting the parallax error and a display for concurrently displaying images from the IR camera module and the VL camera module such that the images register without parallax error.

Certain embodiments of the invention provide a camera that can capture a visible light image and an infrared image of a target scene. The camera includes an infrared lens that can be focused to properly capture an infrared image of the target scene. The camera also includes a display area that displays to a user the visible light and infrared images in a focus mode or an analysis mode. In the focus mode, the alpha-blending of the infrared imagery and the visible imagery on the display is set at a ratio that may assist the user in focusing the infrared image. In analysis mode, the alpha-blending of the infrared imagery and the visible imagery on the display is set at a ratio that may assist the user in analyzing and visualizing the target scene. In some embodiments, the percentage of infrared imagery as compared to the visible imagery is different in the focus mode than in the analysis mode. The camera may be switched between focus mode and analysis mode manually or automatically. A user using a toggle switch or other user interface may perform manual switching. Automatic switching may be provided by automatically sensing when focus mode is desirable, such as when the infrared image is being focused. Certain embodiments of the invention provide a process for mode switching such a camera display.

Certain embodiments of the invention include a camera having a visible camera module with a visible light sensor, an infrared module with an infrared sensor, and a display for concurrently displaying images of a target scene from the infrared camera module and the visible camera module. The infrared module also includes focusable infrared optics. The display provides a focus mode of operation and an analysis mode of operation. Each mode of operation provides a different percentage of alpha-blending between the infrared imagery and the visible imagery. In some of these embodiments, the percentage of infrared imagery of the target scene is different in the focus mode to assist the user in focusing the infrared image and relatively lower in analysis mode to assist the user in analyzing and visualizing the target scene. The modes may be switched manually or automatically. In some of these embodiments, the camera has separate infrared and visible image optics, providing each with different fields of view. Certain embodiments of the invention provide a process for mode switching such a camera display.

Certain embodiments of the invention include a camera for producing visible light (VL) images and infrared (IR) images that includes VL sensors for sensing VL images of a target scene, IR sensors for sensing IR images of a target scene, focusable optics for capturing the target scene, and a display area. The display area in such embodiments displays a composite image including at least a portion of the VL images and the IR images superimposed and alpha-blended in a focus mode or an analysis mode. The focus and analysis modes are particular ratios of the amount VL imagery to IR imagery in the alpha-blended composite image. The analysis mode alpha-blended ratio is different from that for the focus mode and is appropriate for analyzing and visualizing the target scene. The focus mode alpha-blended ratio is appropriate for focusing the optics. The display area is switchable between the focus mode and the analysis mode.

Certain embodiments of the invention include a camera for producing visible light (VL) and infrared (IR) images having a VL camera module, an IR camera module, and a display area. The VL camera module has VL optics and is adapted for capturing VL images. The IR camera module has IR optics and is adapted for capturing IR images. The display area displays a composite that includes at least a portion of the VL images and the IR images superimposed and alpha-blended in one of first and second modes. The modes include particular ratios of the amount of VL images to IR images in the alpha-blended composite image. The first mode alpha-blended ratio is different from the second mode ratio and is generally appropriate for analyze and visualizing the target scene. The second mode alpha-blend ratio is appropriate for registering the VL and IR images on the display. The IR and VL images are translatable on the display relative to each other for registering the IR and VL images on the display. The display is switchable between the first and second modes.

Certain embodiments of the invention include a camera with a computer-readable medium programmed with instructions for performing a method of operating a camera display. The camera display is for displaying a composite image of visible light (VL) and infrared (IR) images of a target scene superimposed and alpha-blended. The medium includes instructions for causing the processor to detect a change in a camera parameter, display the composite image, determine a lack of change in the camera parameter for a period of time, and change the ratio of the composite display after determining the lack of change. The detection of a change in the camera parameter is indicative of a desire to display the composite image with a first ratio of the amount of IR images to the VL images in the alpha-blended composite image.

DETAILED DESCRIPTION

System Description

Figure 1:
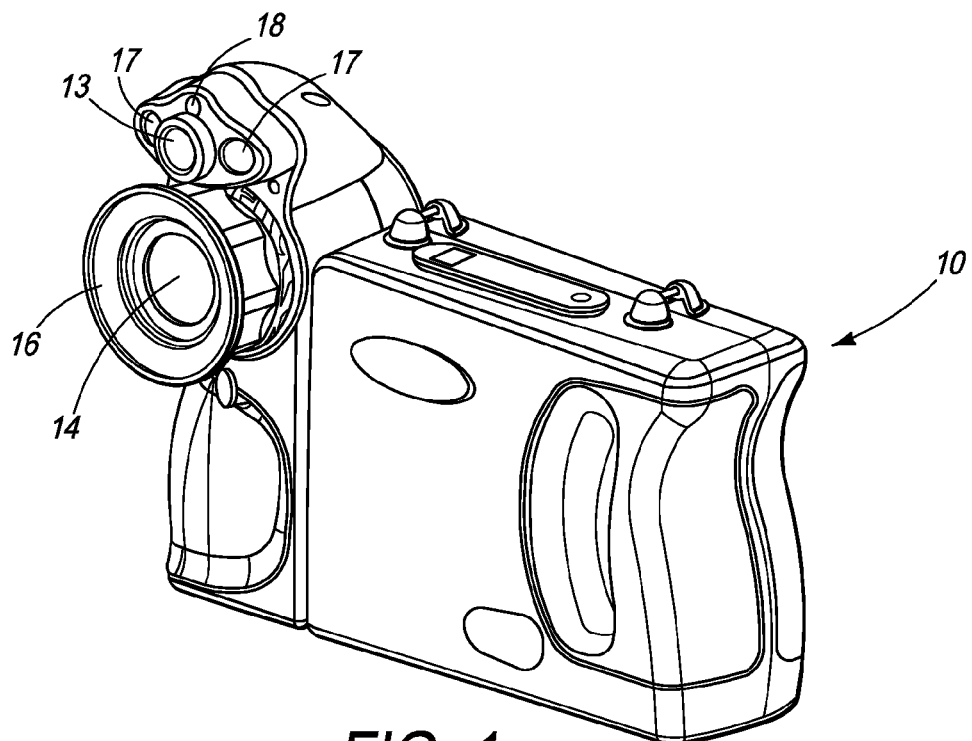
FIGS. 1 and 2 are front and rear perspective views of a camera according to an embodiment of the invention.
Figure 2:
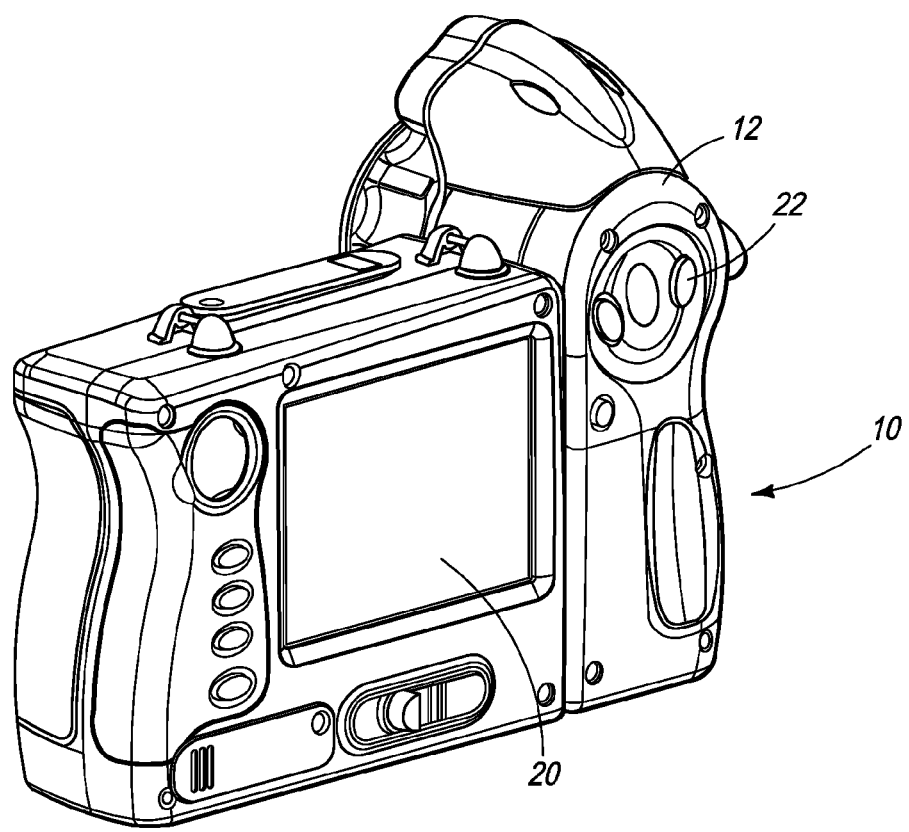

FIGS. 1 and 2 are perspective views of the front and the back of a camera 10 according to an embodiment of the invention. The housing includes an infrared camera module and a visible-light camera module. In particular, the camera 10 includes a camera housing 12, a Visible-Light (VL) lens 13, an infrared lens 14, focus ring 16 and a laser pointer 18 as well as various electronics located within the housing as will be described with reference to FIG. 3. In an embodiment, an LED torch/flash 17 is located on each side of the VL lens 13 to aid in providing enough light in dark environments. A display 20 is located on the back of the camera so that infrared images, visible light images and/or blended images of Infrared and Visible-Light may be viewed. In addition, target site temperature (including temperature measurement spot size) and distance readings may be displayed. Also located on the back of the camera are user controls 22 to control the display mode and activate or deactivate the laser pointer.

Figure 3:
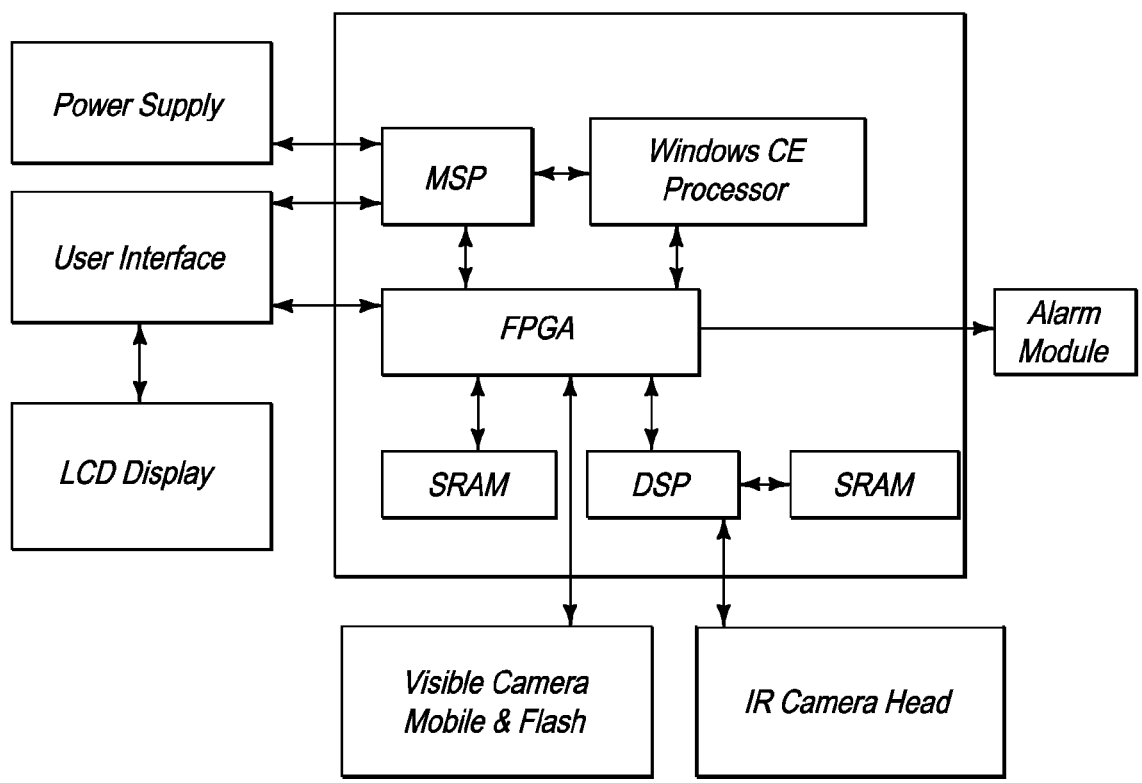
FIG. 3 shows a block diagram of a representative camera system according to an embodiment of the invention that can be used to practice embodiments of the invention.

FIG. 3 shows a block diagram of a representative camera system according to an embodiment of the invention that can be used to practice embodiments of the invention.

The Visible-Light camera module includes a CMOS, CCD or other types of visible-light camera, LED torch/flash and a laser pointer. This camera streams RGB image display data (e.g. 30 Hz) to the FPGA for combination with infrared RGB image data and then sends the combined image data to the display.

The Analog Engine interfaces with and controls the infrared sensor, and streams raw infrared image data (e.g. 30 Hz) to the DSP. The DSP performs computations to convert the raw infrared image data to scene temperatures, and then to RGB colors corresponding to the scene temperatures and selected color palette. For example, U.S. Pat. No. 6,444,983 entitled "Microbolometer Focal Plane Array With Controlled Bias," assigned to the present assignee, is incorporated herein in its entirety, discloses such an infrared camera. The DSP then streams the resulting infrared RGB image display data to the FPGA where it is combined with the VL RGB image data and then sends the combined image data to the display.

The Embedded Processor Card Engine includes a general-purpose microprocessor that provides a graphical user interface (GUI) to the camera operator. This GUI interface consists of menus, text, and graphical display elements that are sent to the FPGA, where they are buffered in SRAM and then sent to the display.

The MSP430 interfaces with the user interface including camera buttons, mouse, LCD backlight, and the smart battery. It reads these inputs and provides the information to the embedded processor card engine where it is used to control the GUI and provides other system control functions.

The FPGA drives the display(s) (LCD and/or TV, for example) with combined visible-light image data, infrared image data, and GUI data. The FPGA requests both the visible-light and infrared image data from the VL and infrared camera modules and alpha-blends them together. It also alpha-blends the resulting display image with the GUI data to create a final blended image that is sent to the LCD display. Of course the display associated with the embodiments of the invention is not limited to an LCD-type display. The FPGA operates under control of the DSP, which is further controlled by the embedded processor card engine. The degree of image alpha-blending and the display mode, i.e. picture-in-a-picture, full screen, color alarm and zoom mode, is controlled by the user through the GUI. These settings are sent from the embedded processor card engine to the DSP which then configures the FPGA properly.

Optical Configuration

Embodiments of the invention combine an engine of a real-time visible-light camera with an engine of a real-time infrared camera close to each other in the same housing such that the optical axes are roughly parallel to each other.

Figure 4:
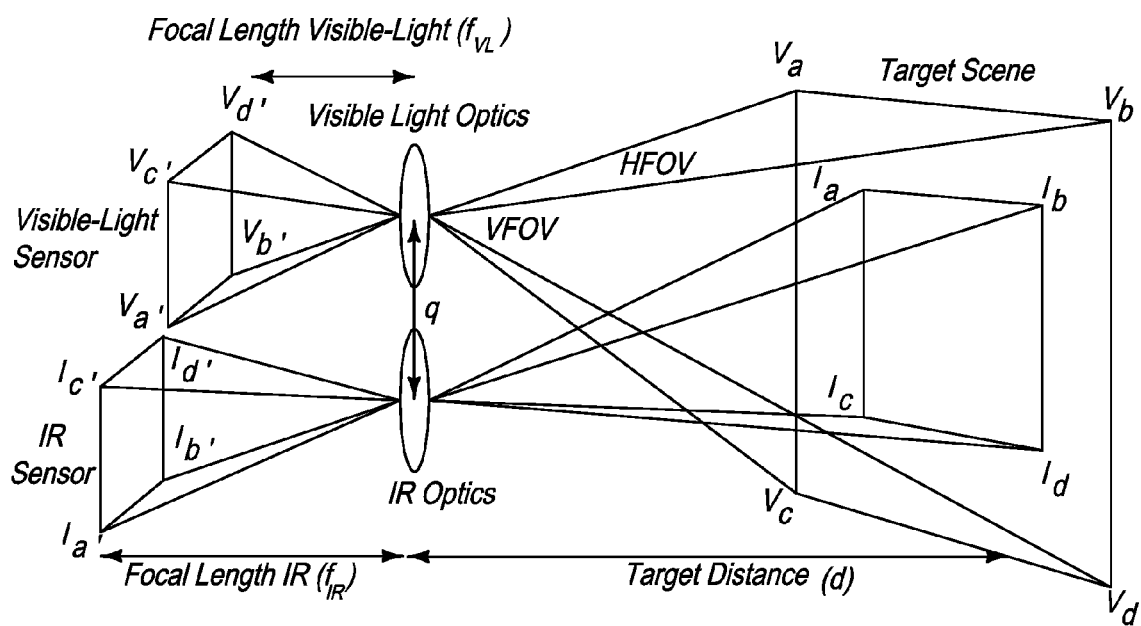
FIG. 4 is a diagram showing the optical path and sensor configuration of the camera.

The camera according to the embodiments of the invention places the engine or module of a real-time visible-light camera in the housing of a real-time infrared camera. The placement is such that the visible and infrared optical axes are as close as practical and roughly parallel to each other, for example, in the vertical plane of the infrared optical axis. Of course other spatial arrangements are possible. The visible light camera module, i.e., VL optics and VL sensor array, are chosen to have a larger field of view (FOV) than the infrared camera module. FIG. 4 is a diagram showing the optical path and sensor configuration of the camera. As shown in the diagram, there are two distinct optical paths and two separate sensors. One for visible-light, and one for infrared. Because the optical paths for the sensors are different, each sensor will "see" the target scene from slightly different vantage points thereby resulting in parallax error. As will be described in detail hereinafter, the parallax error is corrected electronically using software manipulations. This provides the capability to electronically correct the displayed images for parallax. In certain embodiments, the visible-light optics and sensor are chosen so that their respective field of views (FOV) are different, i.e. one is larger than the other. For instance, in one embodiment, the VL FOV is greater than the infrared FOV. This provides cost effectiveness. Presently, for a given number of pixel sensors, visible light sensor arrays are much cheaper than infrared sensor arrays. Accordingly, for a given field of view and resolution (instantaneous field of view), visible light sensor arrays are cheaper than infrared sensor arrays.

In certain embodiments, the visible light optics are such that the visible light camera module remains in focus at all usable distances. Only the infrared lens needs focus adjustment for targets at different distances.

Parallax Correction and Display Modes

Figure 5:
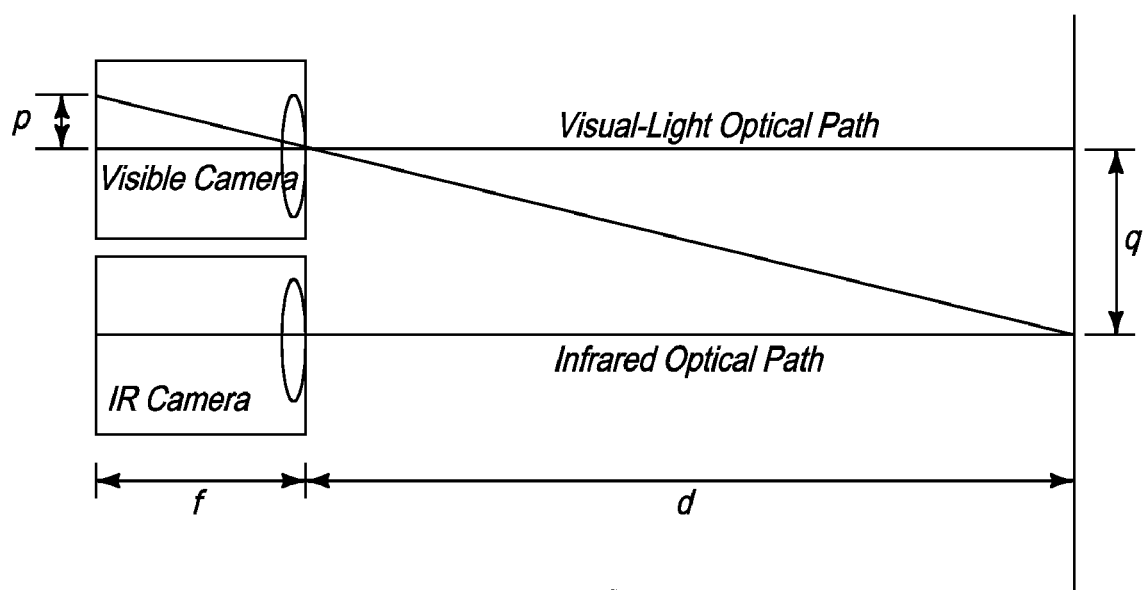
FIG. 5 shows geometrically, the derivation of the parallax equation.

FIG. 5 shows geometrically, the derivation of the parallax equation (p=qf/d). As can be seen by the equation, parallax can be reduced by minimizing the distance (q) between the visible-light and infrared optical apertures, and also by choosing short focal length lenses. The camera design will typically physically fix (q). In certain embodiments, the focal lengths of the visible-light and infrared lens (f) can be altered in the field by changing lenses, or using optical systems that include multiple focal lengths or continuous zoom. In the embodiments with fixed focal length lenses, the focal lengths remain constant during operation once the lenses are installed. Hence, during camera operation, parallax is simply a function of distance (d) to the target. In the embodiment shown, the focal length (f) of each lens is the same. In alternate embodiments, the focal lengths (f) of the infrared lens and the visible lens may differ from each other.

The camera corrects the visible-light and infrared images for parallax and provides several different methods to display the registered images to the operator. These methods are described below. In general, parallax error corrections are based on the infrared focus distance as will be described hereinafter. However, parallax error may also be corrected by determining the distance from the target image (other than via focus distance) by schemes known to those of ordinary skill in the art.

The camera according to the embodiments of the invention can operate in one of three display modes; 1) full screen visible, infrared and/or blended, 2) picture-in-a-picture such as partial infrared image in a full screen visible image, and 3) infrared color alarms in visible-light images. In any one of these display modes, temperatures will be recorded and can be displayed in the infrared portion of the image. Temperatures can also be displayed on a visible-light only image from the recorded but not displayed infrared image.

Figure 6:
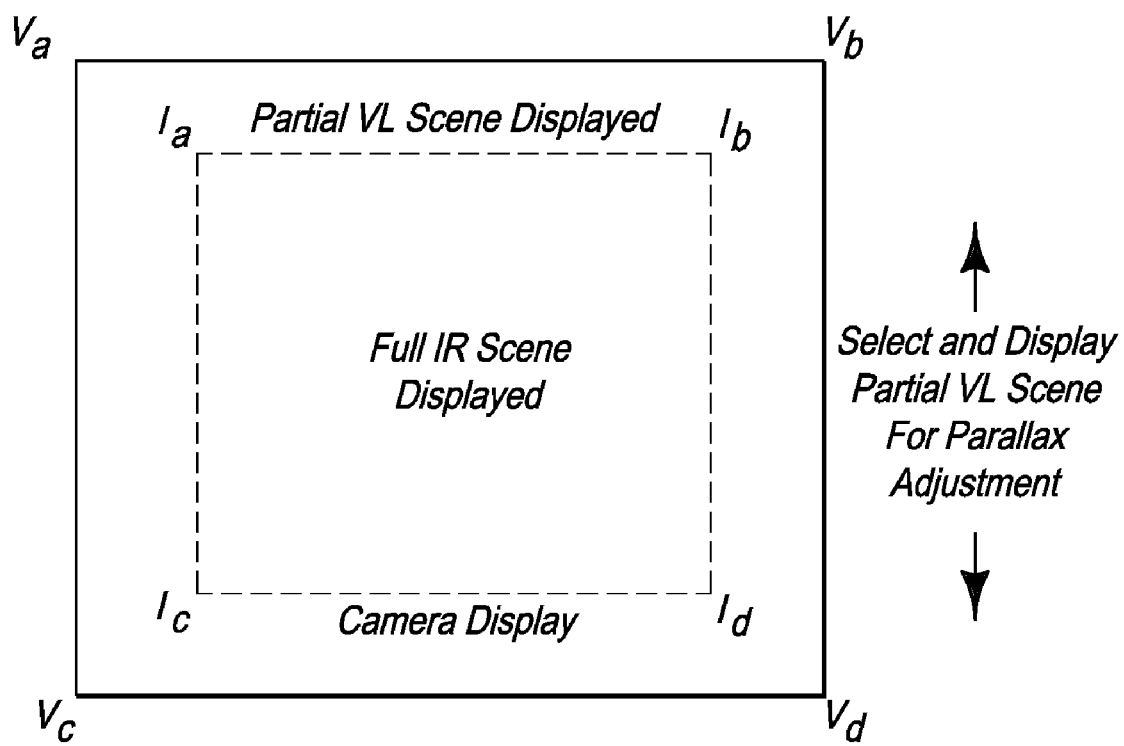
FIG. 6 shows the (Full-Screen, Full-Sensor infrared)/(Full-Screen, Partial-Sensor Visible-Light) scene display mode.

In the full screen display mode, an operator has a choice of selecting for display a full screen visible-light only image, a full screen infrared only image, or a full screen blend of visible-light and infrared images. In an embodiment of the invention, the display is about 320 by 240 pixels and is represented by the dashed-line box shown in FIG. 6. The infrared sensor has 160 by 120 pixels and the visible-light sensor has 1280 by 1024 pixels. These particular dimensions are given by way of example and are not limiting to any of the embodiments of the invention. Thus, the infrared sensor, the VL sensor and display may each be individually larger or smaller than the particular examples given. FIG. 6 shows a diagram of the mode where the full 160 by 120 infrared image is interpolated to fill the camera display. Based on the display mode chosen, a portion of the 1280 by 1024 visible-light image is windowed to match the infrared window. Since the number of selected visible-light sensor elements does not necessarily match the 320 by 240 pixels of the camera display, the visible-light image is scaled to match the camera display. After parallax error correction, each resulting infrared display pixel will represent the same instantaneous field of view (IFOV) as its corresponding visible-light display pixel. Because the two images are matched, the camera operator can easily identify points-of-interest in the infrared image with objects in the visible-light image simply by noting where the features of interest overlie each other in the two images. In the embodiment shown in FIG. 6, the display mode is entitled "Full-Screen, Full-Sensor Infrared and Full-Screen, Partial-Sensor Visible-Light display mode." Additional display modes are discussed further below.

Figure 9:
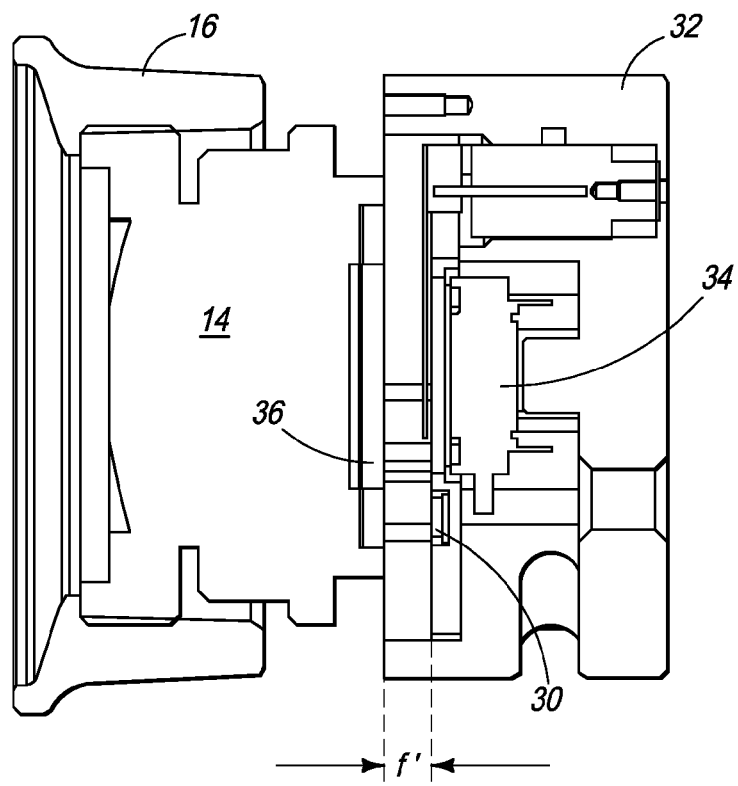
FIGS. 9 and 10 are cross-sectional views of an infrared camera module with a magnet and Hall-Effect sensor according to an embodiment of the invention.
Figure 10:
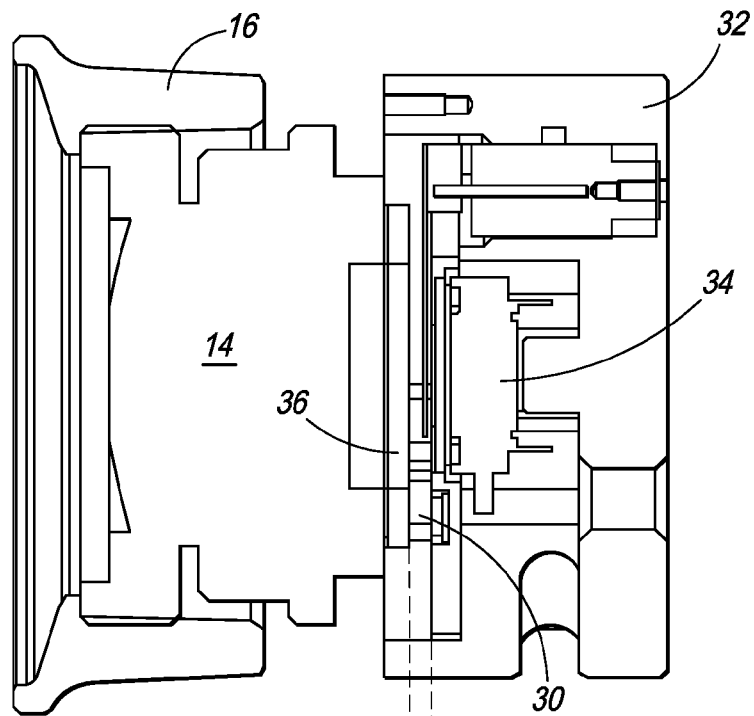

Parallax error between the visible-light image and the infrared image is corrected automatically by the camera. This process is referred to as registering. In order to apply the proper parallax correction, the camera must first determine the distance to the target object of interest. One method to determine the target distance is to sense the focus position of the infrared lens using a Hall-effect sensor. FIGS. 9 and 10 show a sectional view of camera 10 taken from front to rear through the center of infrared lens 14. Referring to FIGS. 9 and 10, a Hall-Effect sensor 30 is fixed in the housing 32 with respect to the infrared sensor array 34 to sense the proximity of a magnet 36 attached to the back of the IR lens 14. As the focus of the lens is changed via rotation of focus ring 16, the distance f' between the magnet 36 and the Hall-Effect sensor 30 changes, resulting in an output from the Hall-Effect sensor that is proportional to focus position. (The focus of the lens could be changed by moving the lens or moving the infrared sensor array.) This focus position is used to derive an estimate of the distance to the target. The infrared lens focus position provides an especially convenient estimate of distance because typical infrared lenses have a low F-number, resulting in a shallow depth of field. The Hall-Effect sensor may, in one embodiment, be fixed on the infrared sensor array. In addition, the positions of the Hall-Effect sensor and magnet may be reversed from that shown.

In the embodiment shown in FIGS. 9 and 10, the magnet 36 is a ring that encircles an interior surface of the focus ring 16 facing the infrared sensor array 34. The Hall-Effect sensor 30 is fixed in the camera housing 32 a small distance from of the infrared sensor array 34. The distance between the Hall-Effect sensor and the magnet represents the distance f' shown in FIGS. 9 and 10. FIG. 9 shows the lens positioned for near focus and FIG. 10 shows the lens positioned for far focus in which case the magnet is closer to the Hall-Effect sensor than in FIG. 9. Mechanisms and methods other than those described above for a Hall effect sensor may, of course, be employed to determine the distance to target. Such equivalent mechanisms or methods would be known to those with skill in the art. The Hall-Effect sensor is one convenient method.

Estimating the distance between the target and the camera is a valuable safety feature. For example, OSHA has specific safety distance requirements when inspecting high voltage electrical cabinets. Thus, using the camera according to the embodiments of the invention, one can display the distance to the target on the display so that the camera operator is assisted in complying with OSHA's safety requirements.

In addition, it can be valuable to know the size of the spot on the target that is being measured (instantaneous field of view spot size). Because the spot size is a function of distance and the embodiments of the invention have the ability to measure (or rather estimate) distance that is needed to correct parallax error, spot size can be calculated as a function of distance and displayed to the camera operator via the display.

Figure 7:
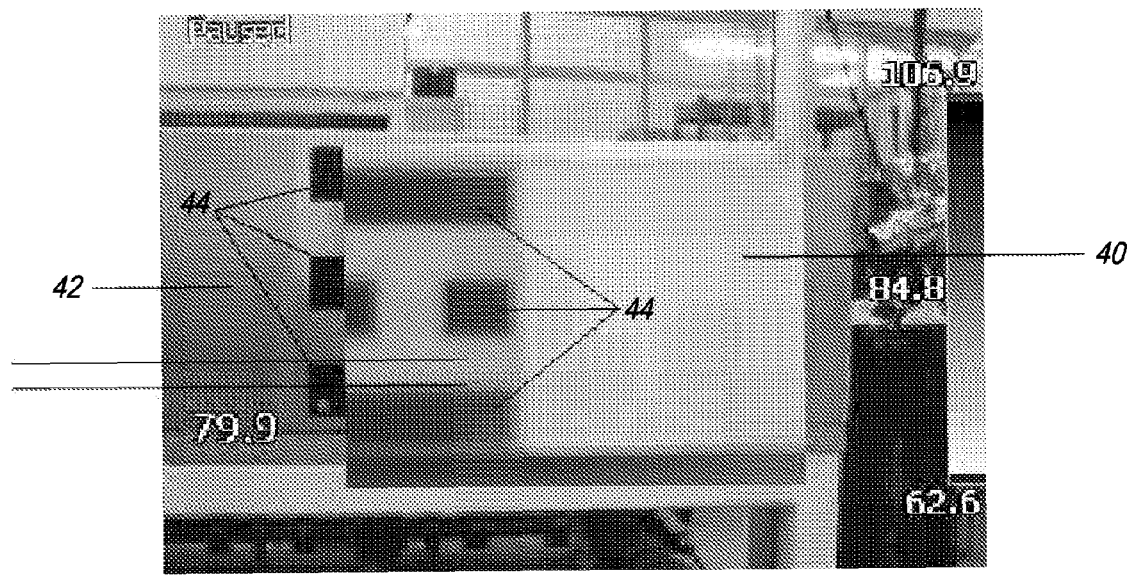
FIG. 7 shows combined visible-light and infrared images uncorrected for parallax error.
Figure 8:
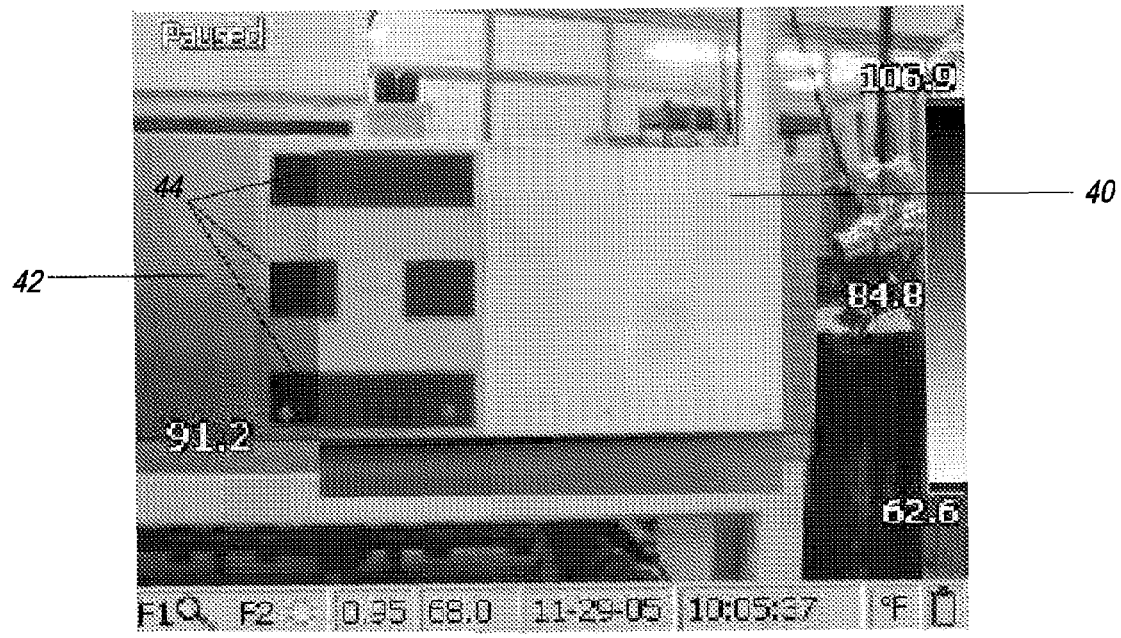
FIG. 8 shows the same images corrected for parallax error.

The lens position sensor value to focus distance correlation for each infrared lens is determined at the factory and stored with other camera calibration data in the camera's non-volatile memory. This calibration data includes X and Y image offsets calculated for each focus distance. By utilizing the sensed infrared lens focus position and the factory calibration data, the correct X and Y sensor offsets of the partial area from the visible-light sensor to be displayed can be computed and used to select the appropriate visible-light sensor area for the current infrared focus distance. That is, as the focus distance of the infrared lens is changed, different areas of the visible-light sensor image are extracted and displayed, resulting in registration of the infrared and visible-light images for objects at the focus distance. FIG. 7 shows combined picture-in-a-picture display of visible-light and infrared images misaligned, i.e. uncorrected for parallax error. FIG. 8 shows the same images corrected for parallax error. Referring to FIG. 7, the center quarter of the display shows a blurry (unfocused) and unregistered infrared-only image 40 placed within the surrounding framework of a visible only image 42. The rectangular dark sections 44 in the image are misaligned (unregistered) showing the parallax error resulting from the unfocused infrared image 44. Referring to FIG. 8, the rectangular dark sections 44 in the infrared image 40 are registered with the portions of such sections 44 in the visible only image 42, showing that infrared image is now properly focused. FIGS. 7 and 8 highlight a method by which a user of camera 10 could focus the infrared image 40 by merely rotating focus ring 16 until image 40 is properly registered. Although FIGS. 7 and 8 show the center quarter of the display as infrared only, this same method and technique could be used for a blended visible and infrared image, whether the images are shown picture in picture, full display, alarm mode, or other display modes.

Note that objects within the scene that are not at the focus distance will still exhibit a parallax error. Nearer objects will exhibit a larger parallax error than objects beyond the focus distance. In practice, parallax error becomes negligible beyond a focus distance of approximately 8 feet for lenses used with typical infrared cameras. Also note that parallax errors can only be corrected down to a limited close focus distance to the camera (typically about 2 feet). This distance is determined by how much "extra" field of view the visible-light sensor provides as compared to the infrared sensor.

When an image is captured, the full visible-light image and the full infrared image with all of the ancillary data are saved in an image file on the camera memory card. That part of the visible-light image not displayed which lies outside of the camera display dimensions when the image was taken is saved as part of the visible-light image. Later, if an adjustment in the registration between the infrared and visible-light image is needed, either in the camera or on a computer, the full visible-light image is available.

The camera allows the operator to adjust the registration of the visible-light and infrared image after an infrared/Visible-light image pair is captured and stored in memory. One way to accomplish this is to use the infrared lens position as an input control. This allows the operator to fine-tune the registration, or to manually register objects in the scene that were not at the infrared focus distance when the images were captured, simply by rotating the focus ring on the lens.

The visible-light image, when it is the only displayed image, is displayed preferably in color, although it need not be. When it is blended with the infrared image, the visible-light image is converted to gray scale before it is blended so that it only adds intensity to the colored infrared image.

Figure 11:
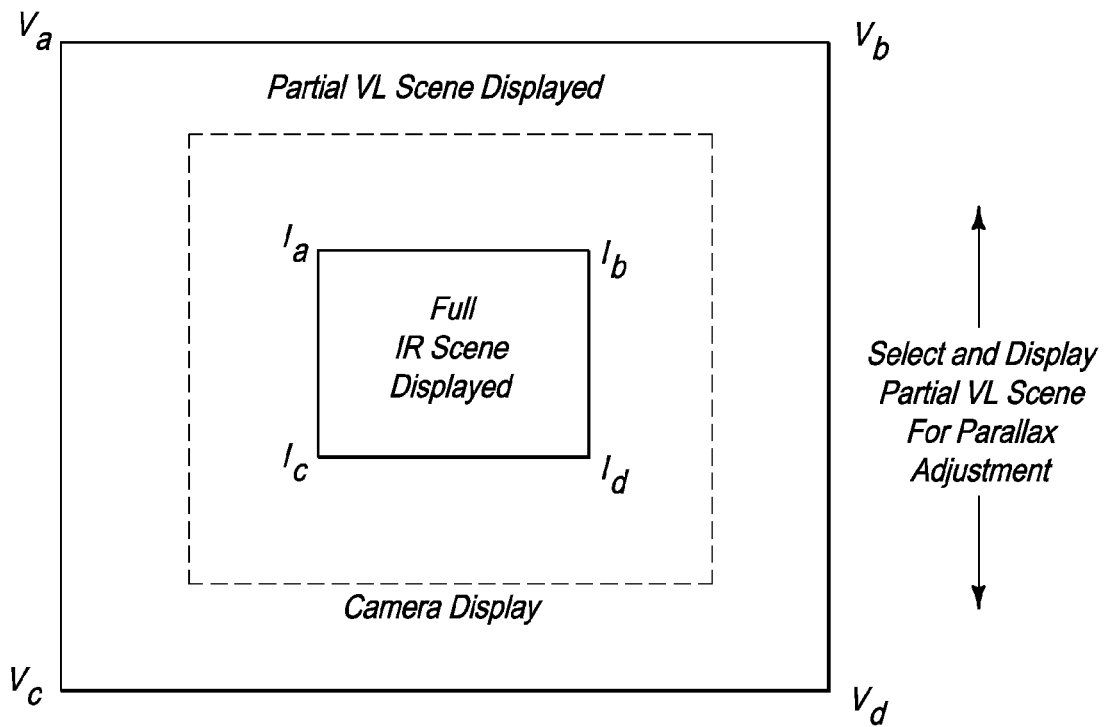
FIG. 11 shows the (Partial-Screen, Full-Sensor infrared)/(Full-Screen, Partial-Sensor Visible-Light) scene display mode. In this mode, the camera uses all of the available infrared sensor elements to provide an infrared image that fills only a central area of the camera display.

FIG. 11 shows the scene display mode entitled "Partial-Screen, Full-Sensor Infrared and Full-Screen, Partial-Sensor Visible-Light display mode." In this mode, the camera uses all of the available infrared sensor elements to provide an infrared image that fills only a central area of the camera display. Standard image processing techniques (e.g. scaling and windowing, for example) are used to fit the infrared image into the desired area of the display. The IFOV of the visible-light image is adjusted to match the IFOV of the infrared image and then a portion of the visible-light image is selected to fill the full display and to match the infrared image in the center of the display. The center quarter of the display can be infrared only, visible-light only or a blend of the two. The remaining three-quarters of the display (outer framework) is visible-light only.

The camera uses the same technique in this mode as that described for the full screen mode to correct for parallax.

Figure 12:
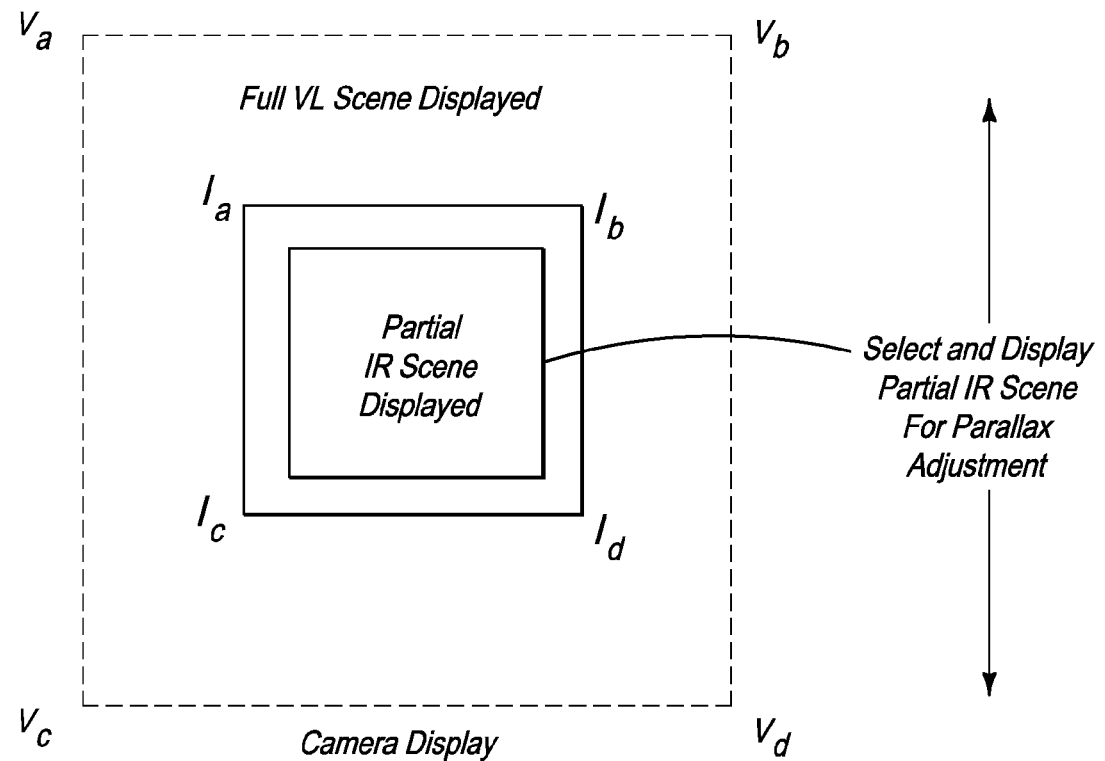
FIG. 12 shows the (Partial-Screen, Partial-Sensor infrared)/(Full-Screen, Full-Sensor Visible-Light) scene display mode. In this mode, the camera uses all of the visible-light sensor elements to fill the display.
Figure 13:
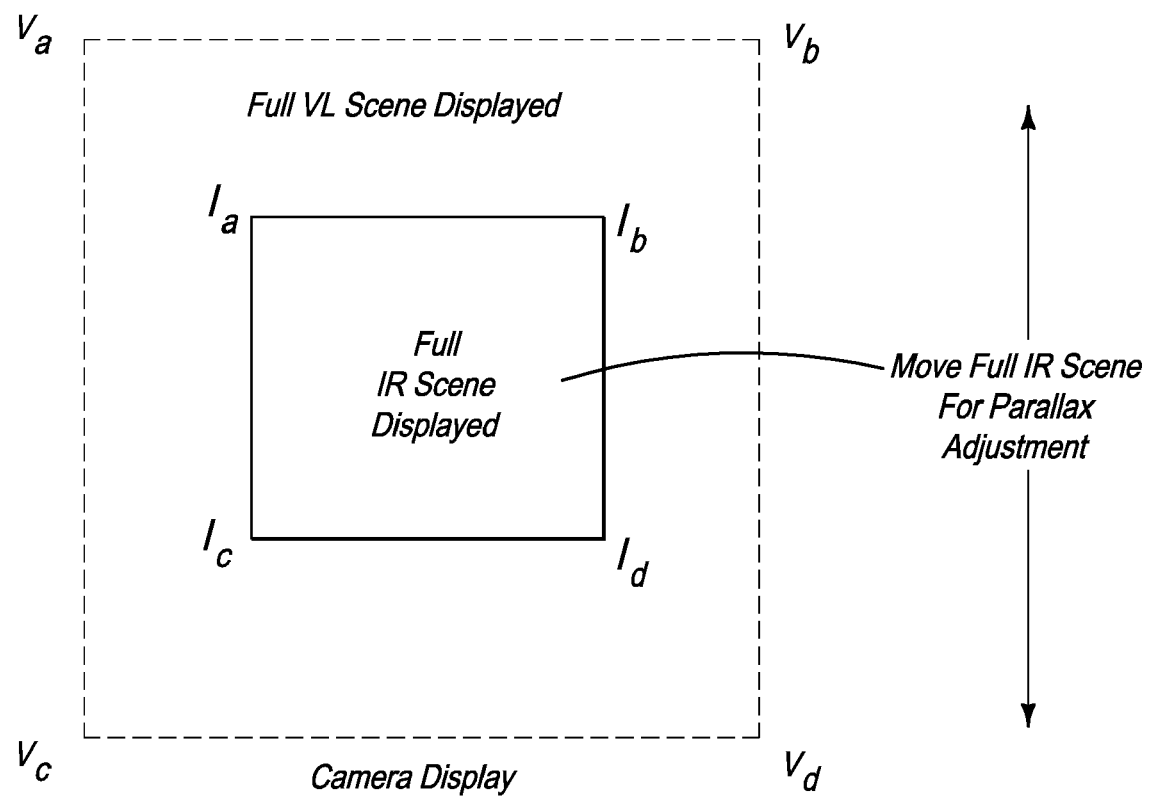
FIG. 13 shows the (Partial-Screen, Full-Sensor infrared)/(Full-Screen, Full-Sensor Visible-Light) scene display mode. In this mode, the camera uses all of the infrared and all of the visible-light sensor elements to construct the displayed images.

Alternatively, instead of matching the visible-light image to the infrared image just the opposite may be done. FIGS. 12 and 13 illustrate this technique. FIG. 12 shows a picture-in-a-picture "Partial-Screen, Partial-Sensor infrared and Full-Screen, Full-Sensor Visible-Light scene display mode." In this mode, the camera uses all of the visible-light sensor elements to fill the display. If the number of visible-light sensor elements does not match the number of display pixels, the camera uses standard imaging techniques to create an image that fills the display screen. A portion of the available infrared sensors is chosen to provide the infrared image. The infrared image is windowed and matched so that the resulting infrared display pixels provide the same IFOV as the visible-light image display pixels.

The camera uses similar techniques to those described for FIG. 6 to correct for parallax. However, in this mode, different areas of the infrared sensor are selected to match the center region of the visible-light image as the infrared focus distance is changed. Note that in this mode, the infrared image is always displayed in a fixed position in the middle of the display.

FIG. 13 shows the "Partial-Screen, Full-Sensor infrared and Full-Screen, Full-Sensor Visible-Light scene display mode." In this mode, the camera uses all of the infrared and all of the visible-light sensor elements to construct the displayed images. The visible-light image is scaled to completely fill the display. The infrared image is windowed and scaled so that the IFOV of the resulting display pixels match the visible-light image. The resulting image is displayed over the matching area of the visible-light image.

Like the previously described mode, parallax is corrected by moving the infrared image scene to align it with the visible-light image scene.

Alpha-Blending

Alpha-blending is a process of ratioing the transparency/opaqueness of two images superimposed on one pixel. If the Alpha=maximum, then the first image is opaque and the second is transparent and is so written to the display. If Alpha=0, then the first image is transparent and the second image is opaque and is so written to the display. Values in-between cause 'blending' (alpha blending) between the two sources, with the formula Display=Source 1*(Alpha/max_Alpha)+Source 2*((max_Alpha-Alpha)/max_Alpha).

Figure 14:
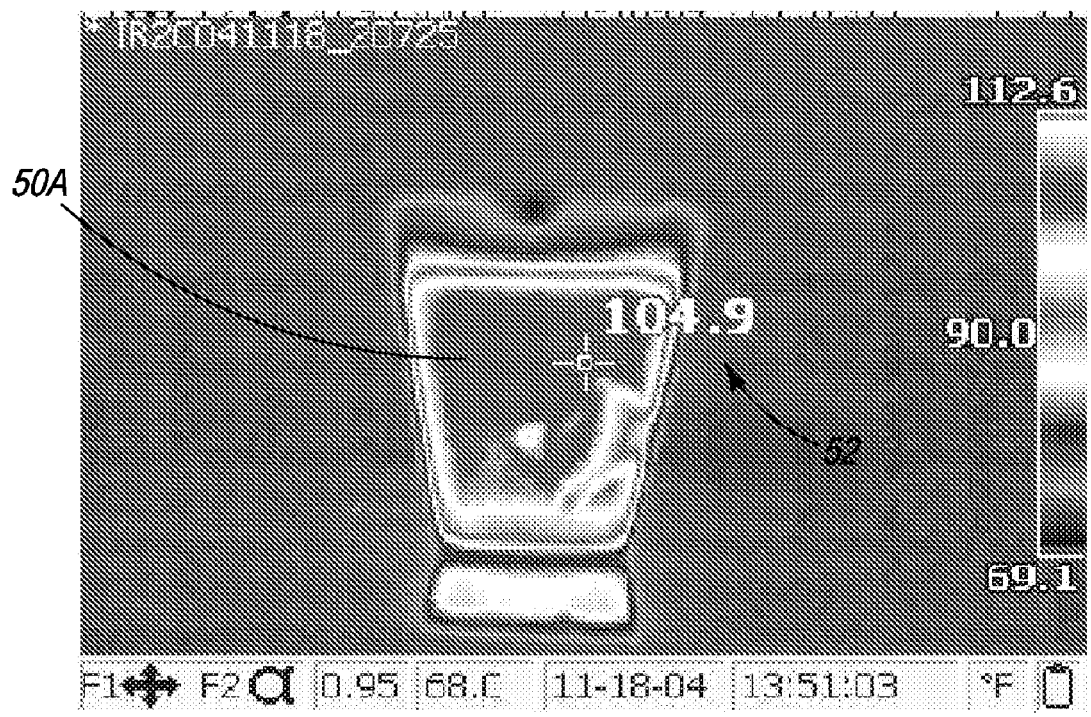
FIGS. 14-16 show respectively, an infrared only image of an insulated cup, a visible-light only image of the cup and a partial alpha-blended image of the cup.
Figure 15:
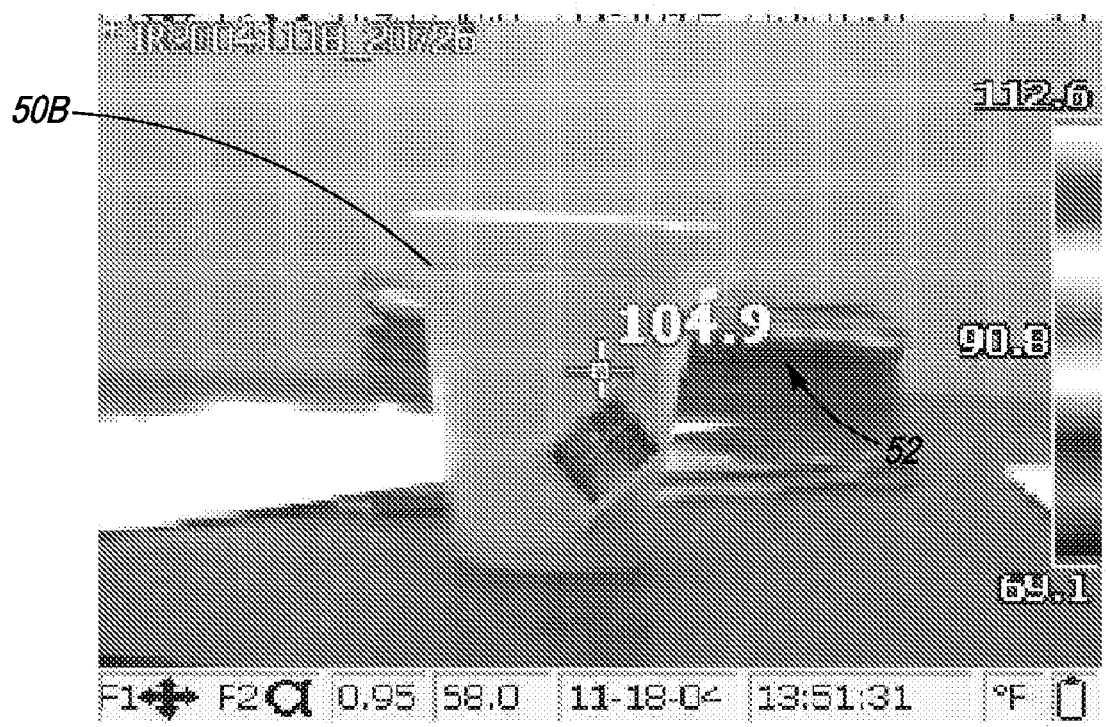
Figure 16:
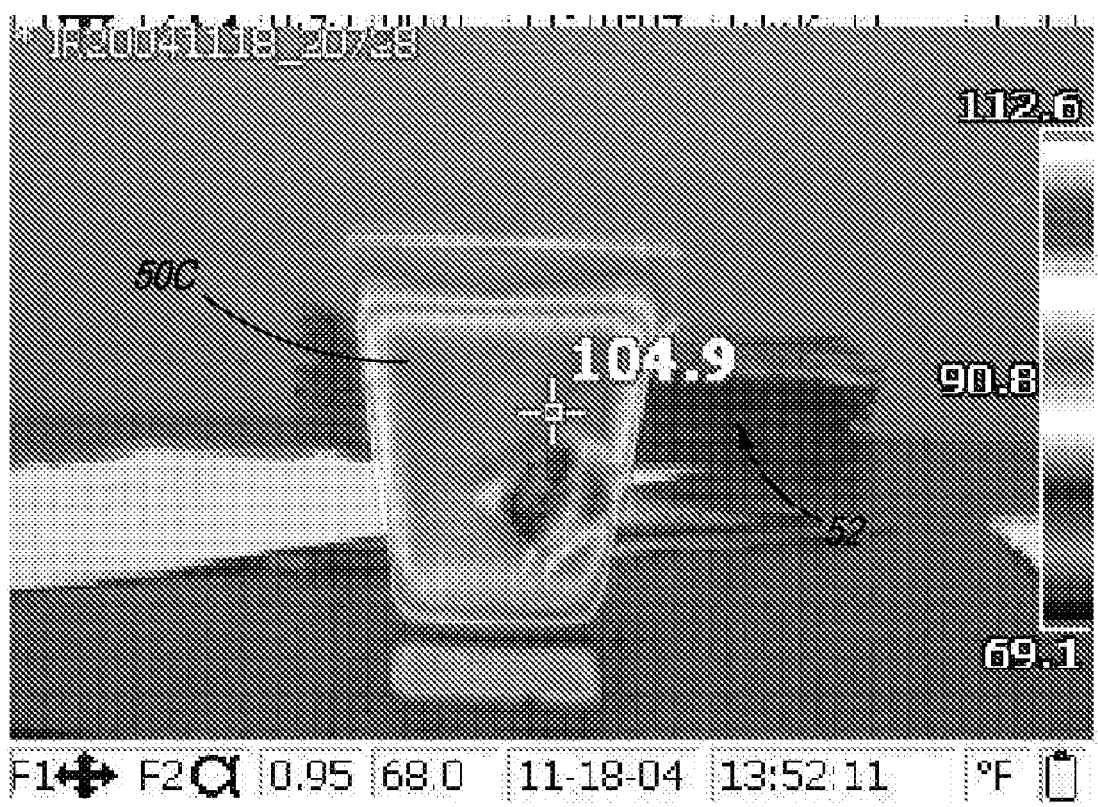

FIGS. 14-16, show respectively, an infrared only image of an insulated cup, a visible light (VL) only image of the cup, and a partial alpha-blending of the infrared and VL images.

The camera will enable the operator to adjust the alpha blending of the visible and infrared images from the extremes of infrared-only (FIG. 14) or visible-only (FIG. 15) to any combination of alpha blending between these two extremes (FIG. 16). Note that although the infrared image is not visible in FIG. 15, the underlying infrared image data is used to display the correct object temperature 52 in the visible light image. Thus, as the cursor is moved over the visible-light image, the temperature 52 associated with the cursor's location on the image is displayed.

The infrared and visible-light images can be displayed in either color or grayscale. When color is used to portray temperatures in the infrared image, the visible image in the overlap area can be displayed in grayscale only so that it doesn't excessively corrupt the infrared palette colors.

When an image is saved, both the visible and infrared images are saved individually so reconstructing images with different alpha blending can be accomplished later either in the camera, or with PC software.

As noted above in the discussion of FIGS. 7 and 8, a user of camera 10 can focus the infrared image 40 by merely rotating focus ring 16 until image 40 is properly registered. Although FIGS. 7 and 8 show the center quarter of the display as infrared only, this same method and technique could be used for a blended visible and infrared image, whether the images are shown picture in picture, full display, alarm mode, or other display modes. Accordingly, in these embodiments, the infrared image 40 can be displayed on display 20 to the user of camera 10 during focusing in order to visualize the sharpness of the displayed infrared image 40. The visible image may also be displayed along with the infrared image in any of the manners discussed herein in order visualize the optimal lens focus position. In addition, the infrared image may be displayed along with the visible image in order to properly register the infrared image with the visible image, whether or not such registration process is accomplished by focusing the infrared imagery or by other methods or mechanisms that could be used to translate the infrared image relative to the visible image until they are properly registered.

However, after the imagery is properly focused or is properly registered with the visible image, the user may want to analyze the target image with a different (e.g., lower) infrared blend than that preferred for focusing and registration. That is, the user may prefer that the display provide an increased amount of visible imagery (in order to better recognize the details of the target scene) while still retaining some infrared information, such as superimposed infrared imagery or other radiometric data (e.g., indications of hotspots, alarms, center point temperature readings, etc.). Accordingly, certain embodiments of the present invention provide a "focus mode" and an "analysis mode" of operation.

In the focus mode of operation, the IR image is at least partially visible on the camera display, independent of whether the display mode is in, as described above, full screen display mode (full screen visible, infrared, and/or blended), picture-in-picture display mode (e.g., partial display infrared image surrounded or bordered by the visible image). The term "focus mode" relates to the percentage amount of the infrared image displayed, not to the location of the infrared image on the display. In certain embodiments of the invention that include a "focus mode," the percentage amount of the infrared image varies from about 50% to 100%. At 50%, the infrared image is alpha-blended 50/50 with the visible image. At 100%, the infrared image is displayed in its area of the display without the visible image (although the visible image could border the 100% infrared image). In other embodiments of the invention that include a focus mode, the percentage of the infrared image is greater than 50%. It is contemplated though that a user of camera 10 may prefer to set the infrared image percentage lower than 50% in the focus mode.

In the analysis mode of operation, the visible image can be more prominently displayed on the display 20 of the camera 10, while the percentage of infrared imagery can be reduced, to improve the camera user's ability to recognize the visible features of the target scene. Similar to the focus mode, the analysis mode relates to the percentage amount of the infrared image displayed (as compared, of course, to the visible image) and is independent of whether the display mode is full screen display mode (full screen visible, infrared, and/or blended), picture-in-picture display mode (e.g., partial display infrared image surrounded or bordered by the visible image). In certain embodiments of the invention that include an "analysis mode," the percentage amount of the infrared image varies from about 0% to 50%. At 50%, the infrared image is alpha-blended 50/50 with the visible image. At 0%, the visible image is without the infrared image. In other embodiments of the invention that include an analysis mode, the percentage of the infrared image is less than 50%. It is contemplated, though, some users may prefer to set the infrared image percentage in the analysis mode higher than 50% or higher than the percentage used for the focus mode.

In embodiments of the invention that include the analysis and focus modes, the camera may include a dedicated or programmable switch that may be used to toggle back and forth between the analysis mode and the focus mode. The switch may be located within user controls 22 (FIG. 2). In embodiments of the invention that include the analysis and focus modes, the camera may provide the ability to manually select the analysis and focus modes via the graphic user interface discussed above. The GUI may also be controlled via user controls 22. In embodiments of the invention that include the analysis and focus modes, the camera 10 may provide automatic switching between the analysis and focus modes based on the processor's detection of which mode is desired.

Figure 31:
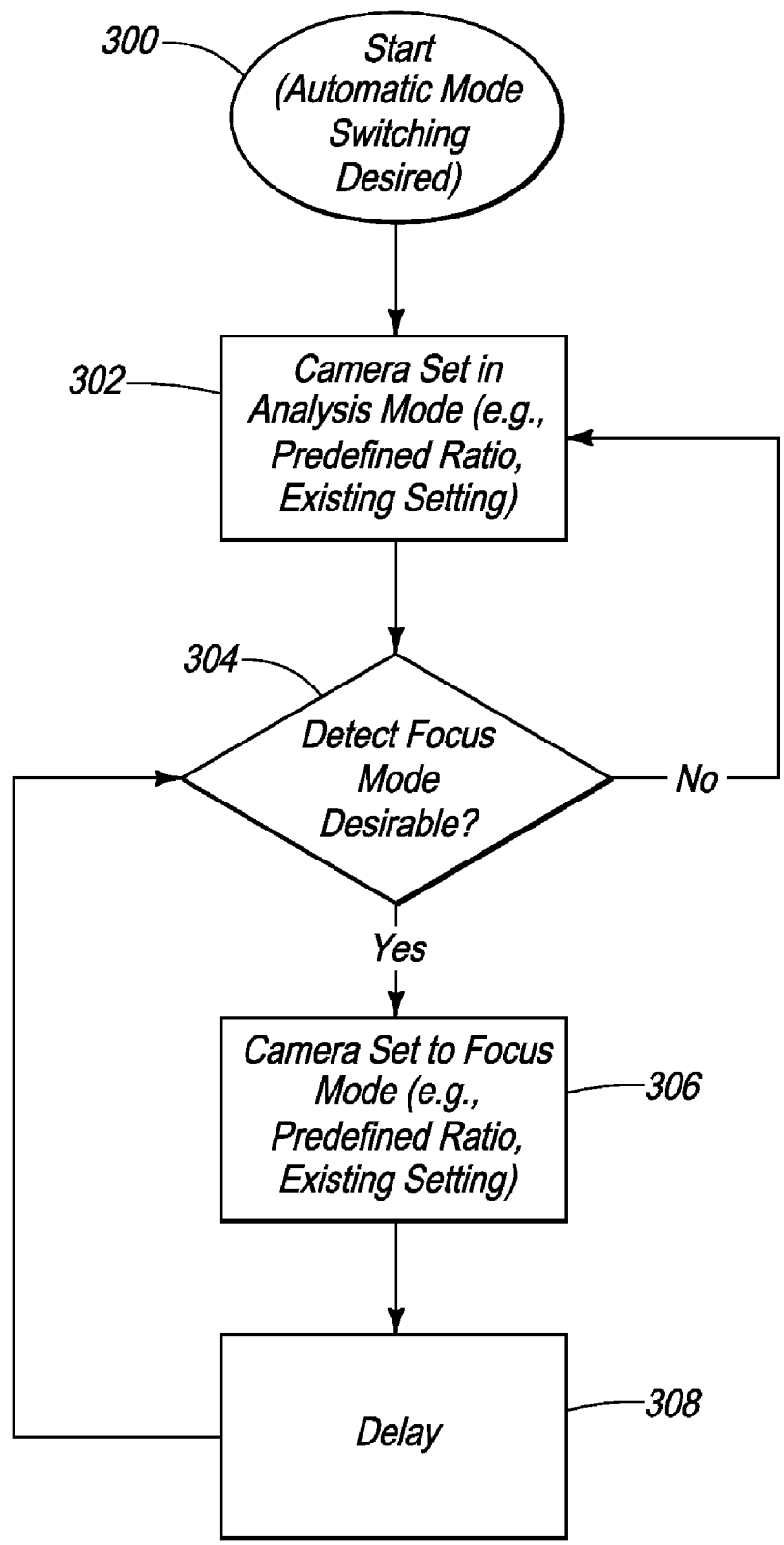
FIG. 31 provides one embodiment of a process for automatic switching between an analysis mode and a focus mode.

Referring to FIG. 31, one embodiment of a process for automatic switching between the analysis and focus modes is provided. Referring to step 300, the processor starts the process if it determines that automatic mode switching is desirable. This condition may be satisfied by a user prompt, via the switch or GUI noted above, or the condition can be automatically satisfied upon power-up of the camera 10. Next, in step 302, the processor sets the display 20 in analysis mode as a default setting. The percentage of infrared imagery in analysis mode may be predefined or preprogrammed by the user or at the factory. Alternatively, the analysis mode infrared ratio may be the existing setting, last used by the user during analysis. It is contemplated that the default setting could instead be focus mode. In step 304, the processor detects whether focus mode is desirable. If not, the process returns to step 302. The detection in step 304 may be accomplished in several ways, including via user inputs from the switches 22 or the GUI. However, since the camera 10 includes the ability to monitor the infrared lens or focus position, the processor can therefore also detect changes to the infrared lens or focus position. When the user begins to rotate the infrared lens, the user likely desires the focus mode for improved focusing. Accordingly, the condition in step 304 may be satisfied by detection of movement of the infrared focus position.

In certain embodiments, the condition in step 304 may be satisfied by detection of the user translating the infrared image relative to the visible image on the display to properly register the infrared image with the visible image, whether or not such registration process is accomplished by focusing the infrared imagery. That is, in some embodiments, the act of focusing of the infrared image also causes the processor to also translate the infrared image relative to the visible image on the display 20 for proper registration to correct for parallax error. However, it is contemplated that other methods or mechanisms, such as controls 22 or the GUI, could be used to translate the infrared image relative to the visible image until they are properly registered, independent of the focusing of the infrared image and independent of whether parallax needed correction. Accordingly, the focus mode may be desirable when performing infrared image translation, whether or not such translation also focuses the infrared image, in order to visualize a sufficient percentage of the infrared image during image registration. Therefore, the condition in step 304 may be satisfied by detection of the user translating the infrared image relative to the visible image on the display to properly register the infrared image with the visible image.

In step 306, the processor changes the mode from analysis mode to focus mode. The percentage of infrared imagery in focus mode may be predefined or preprogrammed by the user or at the factory. Alternatively, the focus mode infrared ratio may be the existing setting, last used by the user during focusing. Step 308 is a delay step of a predetermined or programmable period of time to remain in focus mode before returning back to step 304 to see if focus mode is still desirable. The delay in step 308 gives the user a period of time in focus mode without having to move the infrared lens to determine if the camera is properly focused or without having to translate the infrared image to determine if the images are properly registered. The process may be stopped at any time via a user input, such as via controls 22 or the GUI.

Alarm Modes

Figure 17:
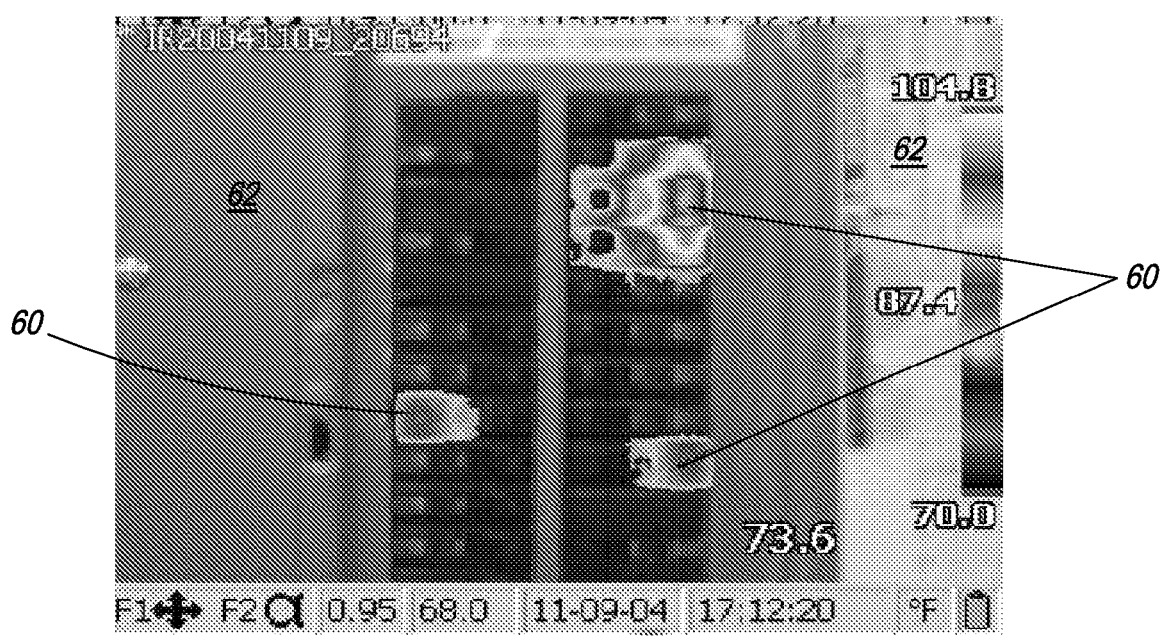
FIG. 17 shows an example of a "hot threshold" alarm mode display.

The camera supports several different visual alarm modes. These modes are used to call the operator's attention to areas of interest in the visible-light image by displaying an alpha-blended or infrared only image in areas that meet the alarm criteria as set by the user. FIG. 17 shows an example of the "hot threshold" alarm mode. Only those pixels in the infrared image that exceed a set temperature threshold (hotspots 60) are displayed. In the color alarm mode, the visible-light image 62 is switched to gray scale so that the infrared image stands out with no ambiguity. The camera can provide alarm modes, such as those described below. Other alarm modes are also possible.

Absolute hot threshold—infrared pixels above a defined temperature are alpha-blended with corresponding visible-image pixels.

Absolute cold threshold—infrared pixels below a defined temperature are alpha-blended with corresponding visible-image pixels.

Relative hot threshold—A temperature range is defined by the user. The temperature range is relative to the current hottest pixel (or average of a set number of hottest pixels) in the scene or from a previous scene or reference scene. Infrared pixels above the threshold defined by the current hottest pixel(s) in the scene minus a user defined or predetermined temperature range are alpha-blended with their corresponding visible-image pixels. For example, if the temperature range is 5 degrees, and the current hottest pixel(s) in the scene is 100 degrees, for example, all infrared pixels above 95 degrees in the scene will be alpha-blended with corresponding visible-light pixels.

Relative cold threshold—A temperature range is defined by the user. The temperature range is relative to the current coldest pixel (or average of a set number of coldest pixels) in the scene or from a previous scene or reference scene. Infrared pixels below the threshold defined by the current coldest pixel(s) in the scene plus a user defined or predetermined temperature range are alpha-blended with their corresponding visible-image pixels. For example, if the temperature range is 5 degrees, and the current coldest pixel(s) in the scene is 10 degrees, all infrared pixels below 15 degrees in the scene will be alpha-blended with corresponding visible-light pixels.

Absolute range (isotherm)—The operator enters a temperature range. Infrared pixels with a temperature within the set range are alpha-blended with their corresponding visible-light pixels. For example, the user enters a range of 80-100 degrees. All infrared pixels with a temperature value within the 80-100 degree range are alpha-blended.

Alarm flash mode—To further call attention to areas of interest, the camera may provide a mode whereby the alpha-blended areas are "flashed" by alternately displaying the alarmed pixels as visible-light only, and then either alpha-blended or infrared only.

The alarm modes identified above may also be indicated audibly or via vibration. Such audible or vibrational alarms may be useful in situations where hotspots are small enough to otherwise go unnoticed in the visual display. In embodiments that include audible or vibration alarms, the camera can generate such an alarm to alert the camera operator when, for instance, the camera detects an out of specification temperature or any of the other alarms modes identified above. Referring back to FIG. 3, the camera may include an alarm module connected to the FPGA that provides audible or vibrational alarms. The vibration mechanism can be similar to that used in cellular phones to alert persons of an incoming call.

PC Software

All of the image display techniques described for the camera can also be implemented in software that runs on a PC host computer and can be applied to images captured by the camera.

Advantages

Figure 18:
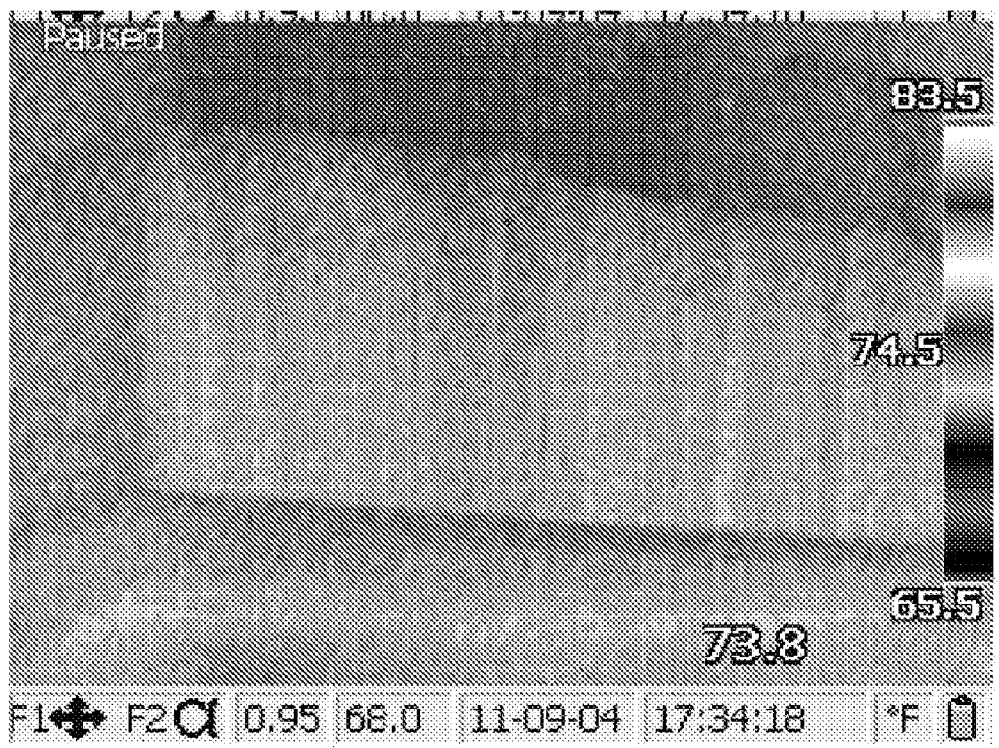
FIG. 18 shows a typical infrared image of a low infrared contrast scene.
Figure 19:
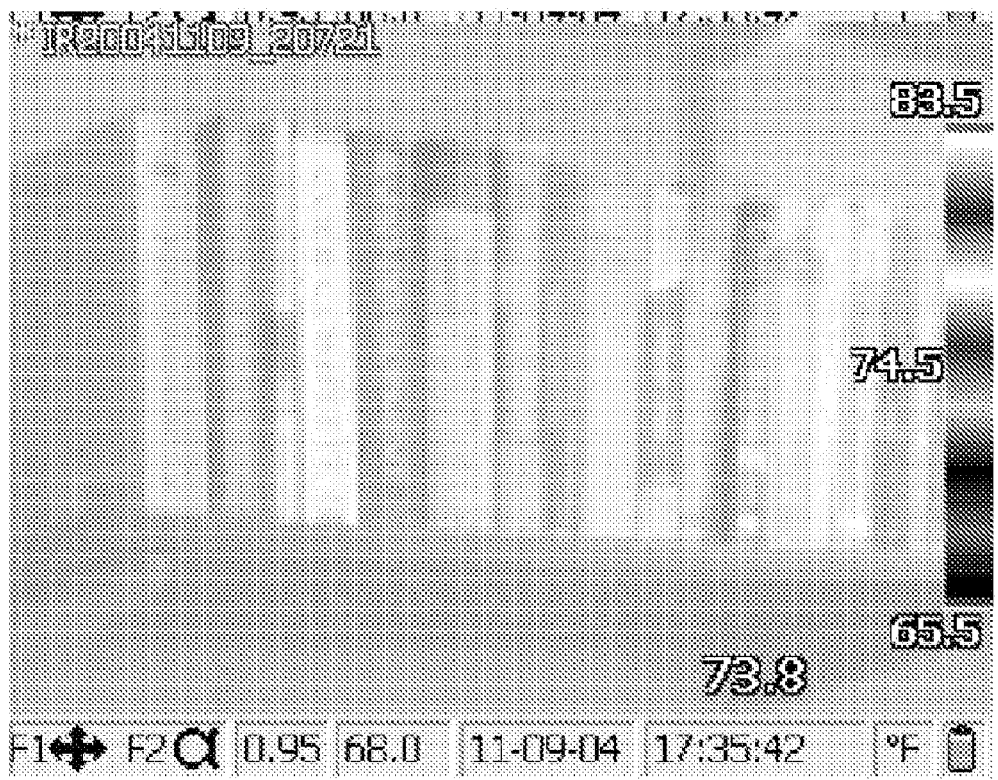
FIG. 19 shows the same scene with an alpha-blended visible-light image, yielding a much higher apparent contrast.

The advantages have already been stated above. The infrared image will not only be sharper with much more detail, it will be surrounded with a visual image showing exactly what and where the infrared targets are. Parallax error will be automatically corrected, yielding a visible-light control image that is correctly registered with the infrared image. Infrared cameras can be made with smaller less expensive detector arrays, yet display the apparent detail and contrast of very expensive infrared cameras with large and ultra-sensitive detector arrays. FIG. 18 shows a typical infrared image of a low infrared contrast scene. FIG. 19 shows the same scene with an alpha-blended visible-light image, yielding a much higher apparent contrast with target site temperature measurement.

Uses

This camera can be used in all phases of infrared thermography where current infrared cameras are used today and in the future. In the case of the simplest uses such as an electricians tool, the camera can be made inexpensively with a small infrared detector array and yet have very high performance—high image quality with high spatial resolution and accurate temperature. In the case of high-end thermography the camera can be made at a lower cost and have images with greater apparent detail than the most expensive infrared cameras. The camera will eliminate the need to take separate visible-light images to be included in thermography reports.

Laser Pointer

Various applications are possible using the laser embodiments of the present invention. As previously mentioned, because the laser pointer radiation is in the visible spectrum, it is not visible in the infrared image. As a result, the laser pointer is of limited value in infrared cameras. This is problematic when the location of a hot or cold spot is difficult to identify. For example, large industrial control panels often have many components that are similar in shape and packed tightly together. It is sometimes difficult to determine the exact component that is causing a hot spot in the infrared camera image. In addition, in building inspection applications where a wall appears uniform in the visible image but shows a defect in the infrared image, the laser pointer of the embodiments of the invention can be used to identify the exact location of the defect on the wall. For roof leak detection applications, it can greatly aid the thermographer in marking the area suspected of needing repair. The camera operator can outline the wet area by adjusting the camera pointing so that the laser spot seen in the image outlines the suspected wet area in the image and thus also outlines the suspected wet area on the roof with the laser beam so that it can be correctly marked. In an R&D application where the target is complex such as a printed wiring board assembly, the laser pointer embodiments of the invention may aid in identifying the location of the infrared point of interest.

Figure 24:
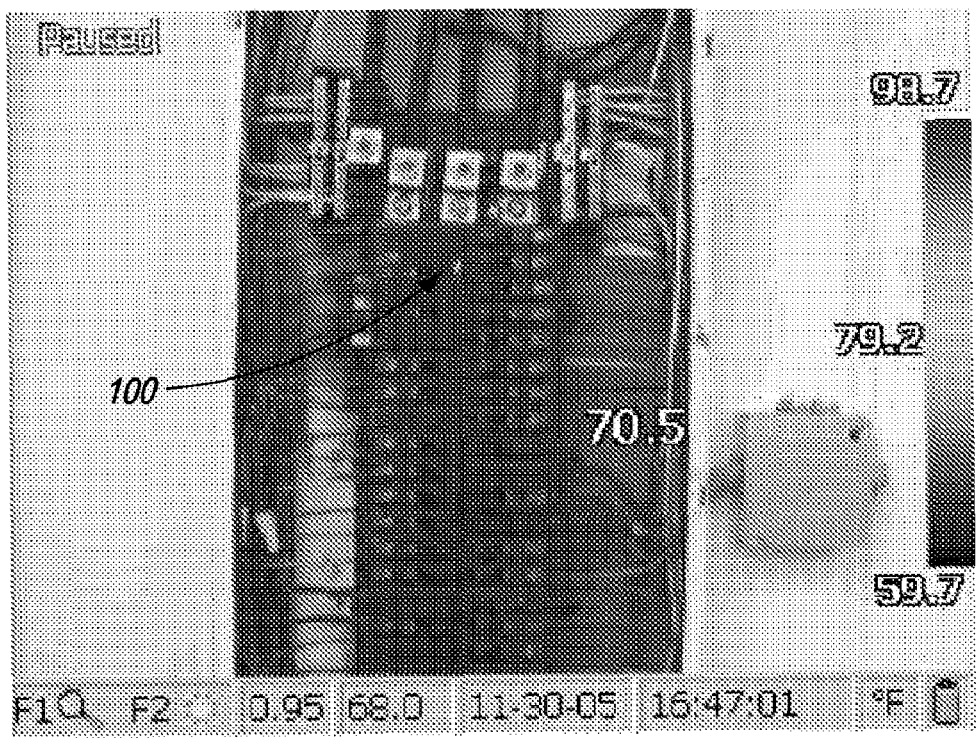
FIGS. 24-26 show, respectively, a visible-light only image with a laser point, an alpha-blended visible-light/infrared image with a laser point and hot spot not aligned, and an alpha-blended visible-light/infrared image with a laser point spot aligned.
Figure 25:
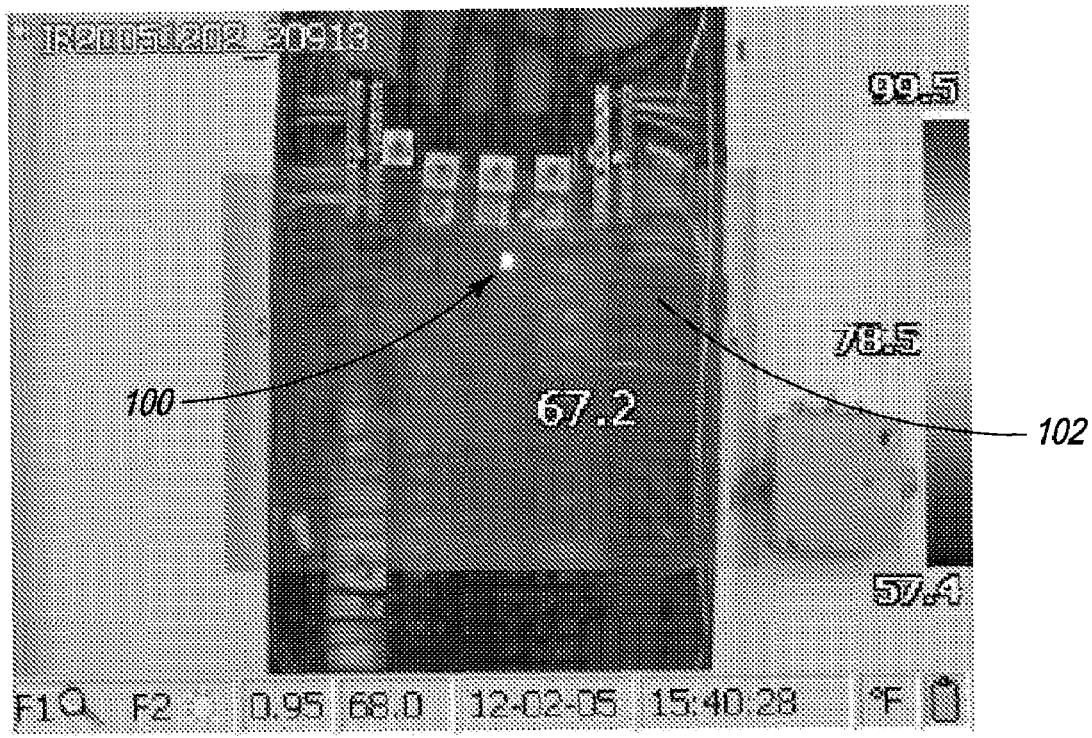
Figure 26:
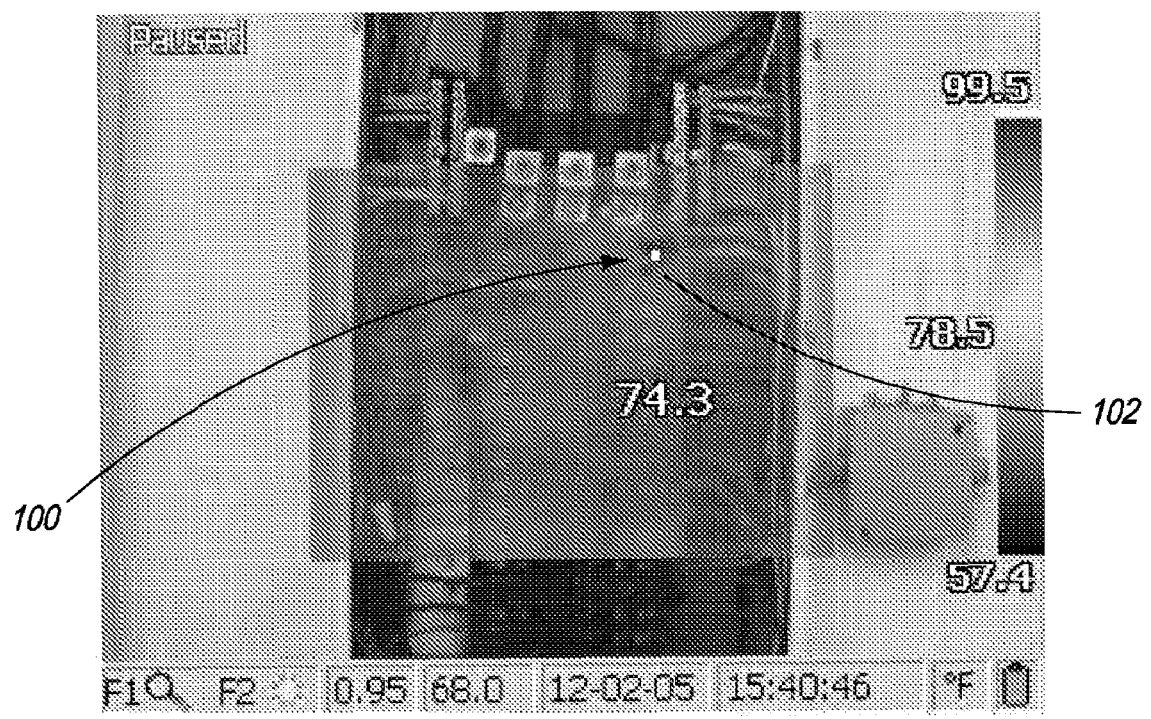

The laser pointer of the embodiments of the invention is used to accurately identify the location of infrared points-of-interest and to easily aid the focusing of the infrared optics. FIGS. 24-26 show an associated sequence of events. The laser pointer can be turned on using one of the camera's programmable buttons or by other mechanisms by the camera operator. At a reasonable distance, the laser pointer spot 100 on the target can be seen in the visible-light image (FIG. 24) and in the blended visible-light and infrared image that has been corrected for parallax error (FIG. 25). Once the laser spot is identified in the blended image (FIG. 25), the camera operator can adjust the camera pointing until the laser spot in the blended image matches the spot of interest 102 in the infrared image (FIG. 26). The laser beam then marks the target at the point-of-interest (FIG. 26).

Figure 27:
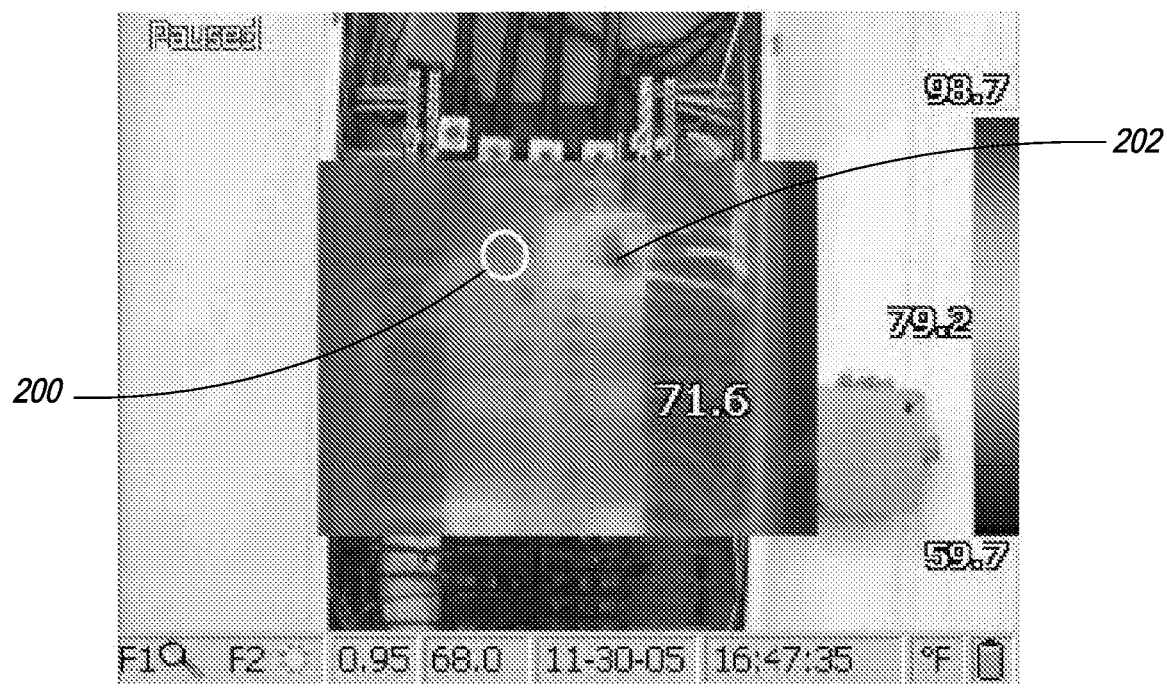
FIGS. 27-28 show, respectively, an infrared only image with a computer generated laser pointer and hot spot not aligned and an infrared only image with the computer generated laser pointer and hot spot aligned.
Figure 28:
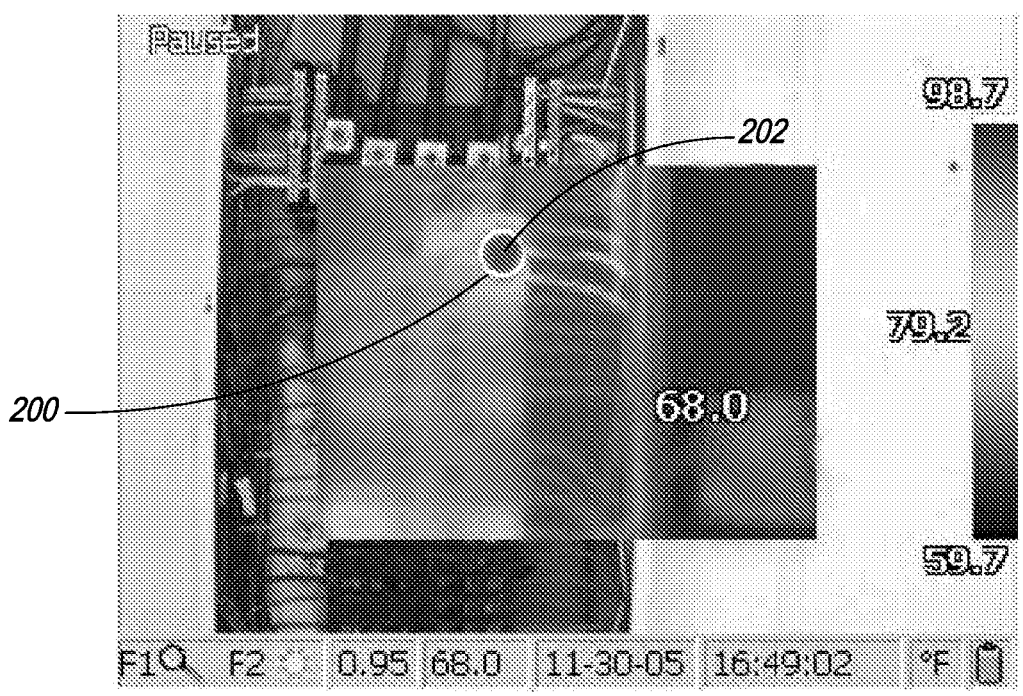

Because the camera according to the embodiments of the invention has been calibrated in the factory to identify the location of the laser spot in the infrared image using parallax calibration data as a function of infrared camera module focus distance, the camera operator does not need to see displayed the laser spot in the VL image. If the target is at a distance and/or has a low reflection for the laser wavelength, the laser spot may be too weak for the VL camera to show prominently on the camera display but it can still be seen on the target by the human observer. FIGS. 27 and 28 show an associated sequence of events. In this case, the infrared focus is adjusted as normally done by observing the sharpness of the infrared image. A computer-generated laser spot reference mark 200 is registered with the infrared image so that a representative mark (e.g., circle) is displayed on the infrared image (FIG. 27). The camera operator then adjusts the camera pointing until the laser calibration mark 200 lies over the infrared point-of-interest 202 (FIG. 28). Once that happens, the laser beam then strikes the target at the point of interest.

Figure 20:
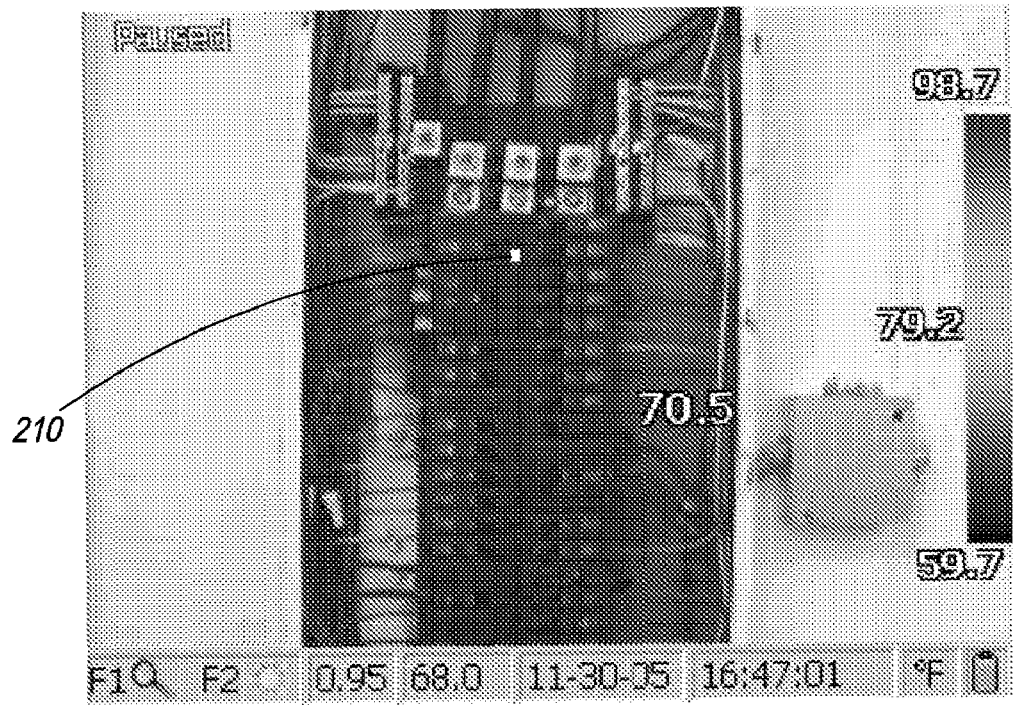
FIGS. 20-23 show, respectively, a visible-light image with a laser spot, a visible-light image with the laser spot and a computer generated laser marker aligned with the laser spot, an infrared only image with the computer generated laser marker and hot spot not aligned, and an infrared only image with the computer generated laser marker and hot spot aligned.
Figure 21:
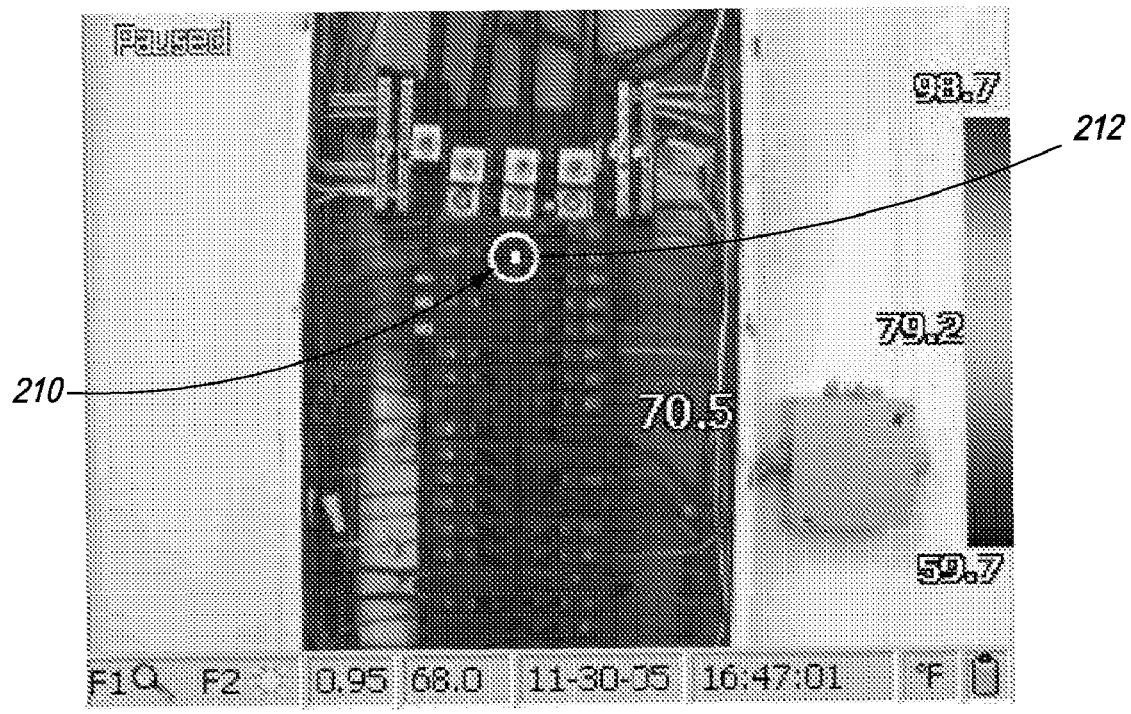
Figure 22:
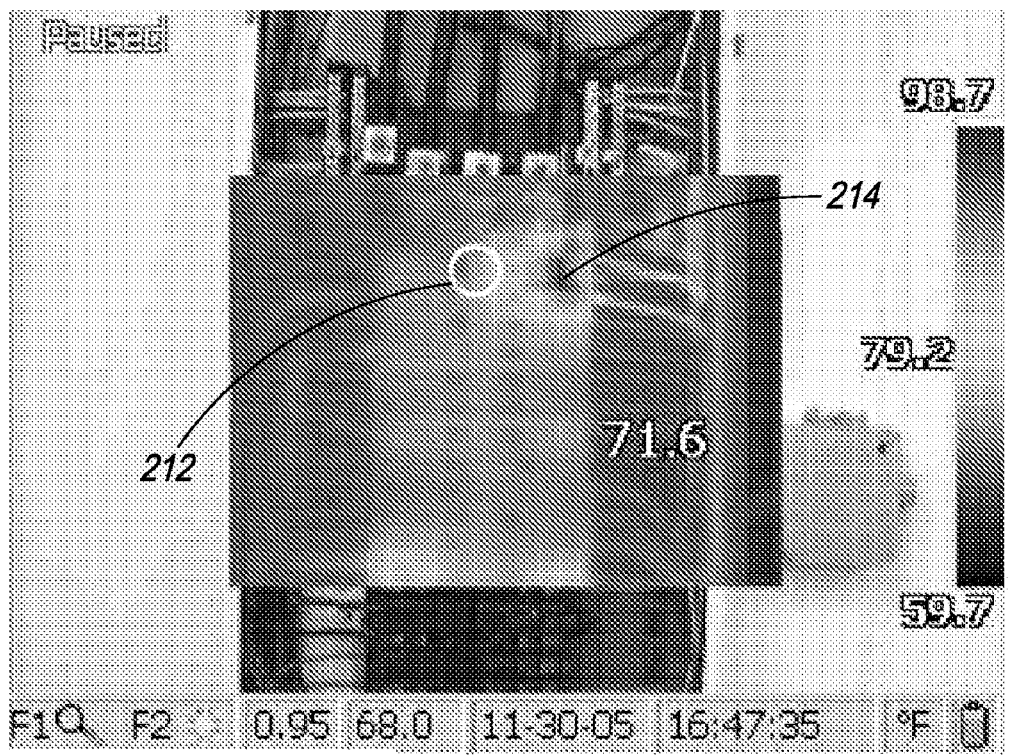
Figure 23:
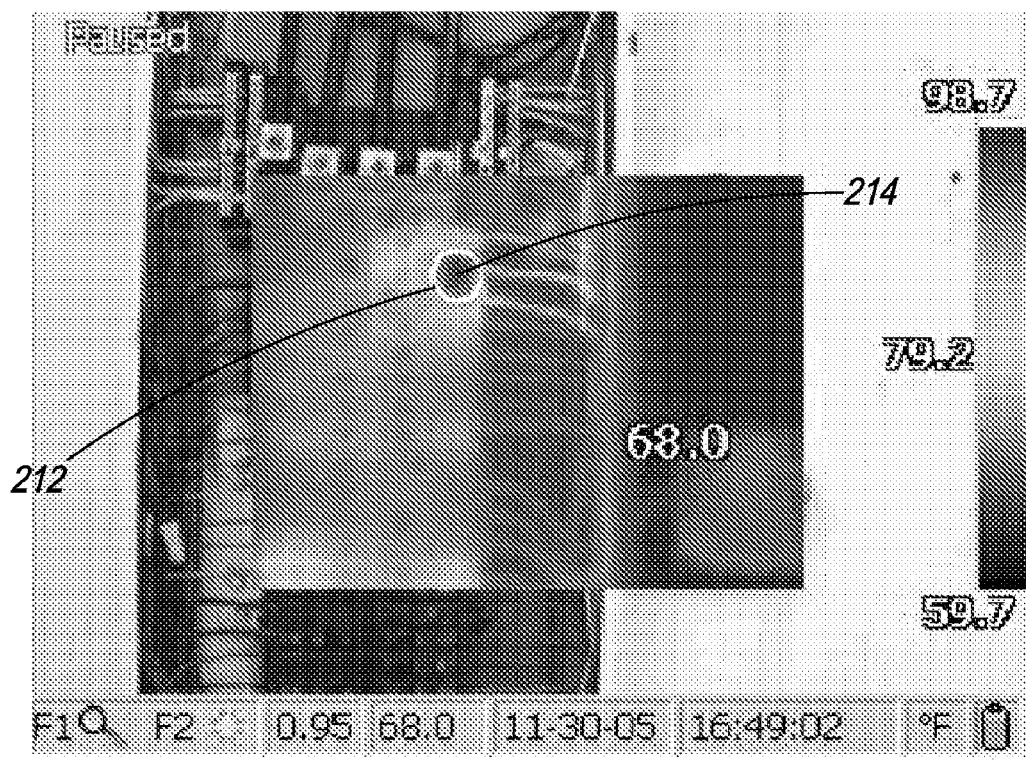

Alternatively, the camera operator first focuses the infrared image using an infrared display image only, switches to the visible-light display where the laser 210 will be shown in the display as seen in FIG. 20. The operator marks the laser spot 210 on the display with a marking 212 such as a circle (see FIG. 21) and then switches the display back to the infrared only (see FIG. 22) where the marking 212 is registered with the infrared image and it is displayed on the infrared image, positioned in the center quarter of the display area. The operator then adjusts the camera pointing so that the mark 212 on the infrared display matches the thermal spot of interest 214 on the infrared display. (see FIG. 23) Once that happens, the laser beam then strikes the target at the point of interest.

Using the Laser Pointer to Focus the Infrared Image

Figure 29:
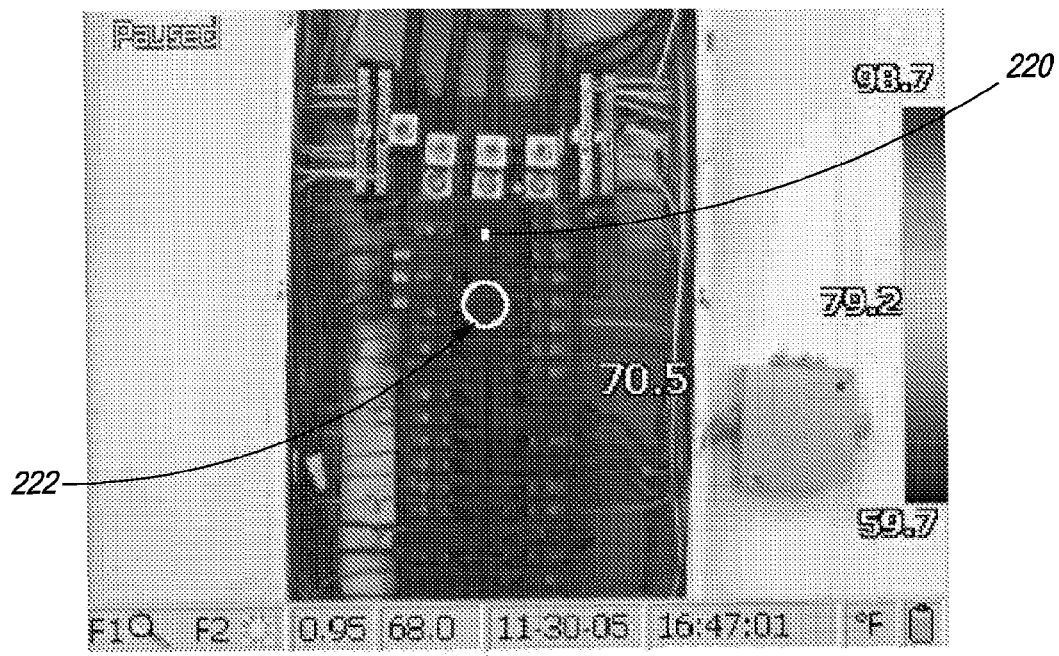
FIGS. 29-30 show, respectively, a visible-light only image with a laser spot and a computer generated laser marker not aligned and a visible-light only image with the laser spot and computer generated laser marker aligned.
Figure 30:
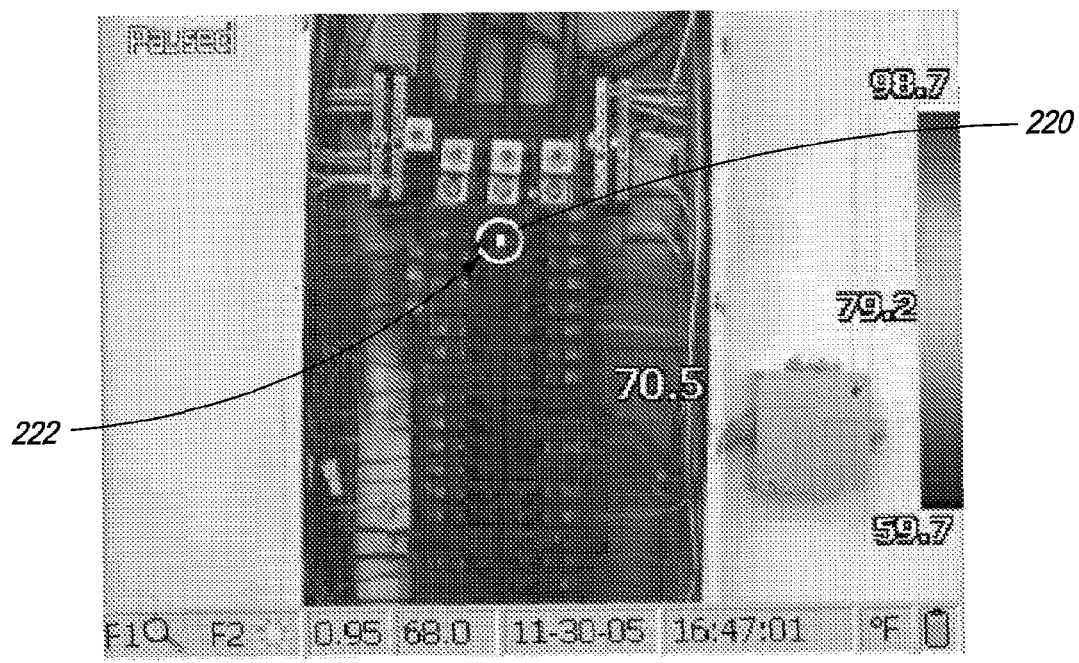

With calibration data correcting for parallax between the laser pointer and the infrared image and the ability to see the actual laser spot in the VL image, a process for monitoring and aiding the infrared focus is possible. FIGS. 29 and 30 show an associated sequence of events. In this case, the location of the laser spot 220 is visible in the VL image (FIG. 29). The camera according to the embodiments of the invention has been calibrated in the factory to generate a computer-generated laser spot reference mark 222 that indicates the location of the laser spot in a focused infrared image using parallax calibration data as a function of infrared camera module focus distance. This reference mark may be displayed in the IR image or the VL image (that overlaps the IR image). In FIG. 29, the reference mark 222 is shown in the VL only image. As the infrared lens is adjusted, the mark moves in the VL image showing the spot where the laser dot would be in the infrared image. When the infrared mark is coincident with the laser dot seen in the VL image (FIG. 30), the focus adjustment may stop and the infrared camera module is in focus. This allows the most novice operator to focus the infrared lens and eliminates the subjective nature of focusing.

The invention claimed is:

1. A camera for producing visible-light (VL) images and infrared (IR) images, comprising:
    VL sensors for sensing VL images of a target scene;
    IR sensors for sensing IR images of the target scene;
    focusable optics for capturing the target scene; and
    a display area for displaying a composite image including at least a portion of the VL images and the IR images superimposed and blended in one of a focus mode and an analysis mode, the modes being particular ratios of the amount of VL images to the IR images in the blended composite image, the analysis mode blend ratio being different from the focus mode ratio and being appropriate for analyzing and visualizing the target scene, the focus mode blend ratio being appropriate for focusing the optics, the analysis mode being the default mode used by the display area, and the display area being switchable between the focus mode and the analysis mode.

2. The camera of claim 1, wherein the focusable optics are optics for the IR sensors.

3. The camera of claim 2, further including optics for the VL sensors, and wherein the VL optics and IR optics have different fields of view so that the VL and IR images of the target scene have a parallax error.

4. The camera of claim 3, wherein focusing the IR optics registers the VL and IR images to correct the parallax error.

5. The camera of claim 4, wherein a detection of focusing the IR optics causes a switch to the focus mode.

6. The camera of claim 1, wherein the analysis mode blend ratio is higher than the focus mode ratio.

7. The camera of claim 6, further including a sensor for detecting a focus change in the focusable optics.

8. The camera of claim 7, wherein the sensor includes a hall effect sensor.

9. The camera of claim 1, wherein the display area is automatically switchable between the focus mode and the analysis mode.

10. The camera of claim 9, wherein the display is automatically switched to the focus mode after detection of a focus change in the focusable optics.

11. The camera of claim 1, wherein the display area is manually switchable between the focus mode and the analysis mode via camera user controls.

12. The camera of claim 1, wherein the analysis mode blend ratio is such that the percentage of IR images in the composite image is 100%.

13. The camera of claim 1, wherein the focus mode blend ratio is such that the percentage of VL images in the composite image is 100%.

14. The camera of claim 1, wherein the percentage of IR images in the composite image in the focus mode varies from about 50% to 100%.

15. The camera of claim 1, wherein the percentage of VL images in the composite image in the focus mode varies from about 0% to 50%.

16. The camera of claim 1, wherein the superimposed and blended VL and IR images are registered together.

17. The camera of claim 1, wherein the VL sensors and the IR sensors each include arrays of sensors.

18. The camera of claim 1, wherein the blending is alpha-blending.

19. The camera of claim 1, wherein the focus mode and analysis mode blend ratios are one of preset, user-defined, the most recent user blend ratio employed by the user.

20. A camera producing visible light (VL) and infrared (IR) images, the camera comprising:
a VL camera module having VL optics and adapted for capturing VL images;
an IR camera module having IR optics and adapted for capturing IR images; and
a display area for displaying a composite image including at least a portion of the VL images and the IR images superimposed and blended in one of first and second modes, the modes being particular ratios of the amount of VL images to IR images in the blended composite image, the first mode blend ratio being different from the second mode ratio and being appropriate for analyzing and visualizing the target scene, the second mode blend ratio being appropriate for registering the VL and IR images on the display, the first mode blend ratio being the default mode used by the display area, and the IR images and VL images translatable on the display relative to one another for registering the IR and VL images on the display, the display area being able to toggle between the first and second modes.

21. The camera of claim 20, wherein the first and second modes are analysis and focus modes, respectively.

22. The camera of claim 20, wherein the IR optics are focusable.

23. The camera of claim 22, wherein focusing the IR optics translates the IR images relative to the VL images.

24. The camera of claim 23, wherein a detection of focusing the IR optics causes a switch to the second mode.

25. The camera of claim 20, wherein actuation of a camera control mechanism translates the IR images.

26. The camera of claim 20, wherein actuation of the camera control causes a switch to the second mode.

27. The camera of claim 20, wherein the VL optics and the IR optics have separate fields of view so that the VL and IR images of a target scene have a parallax error.

28. The camera of claim 27, wherein the translation of the IR images corrects the parallax error.

29. A camera with a computer-readable medium programmed with instructions for performing a method of operating a camera display, the camera display for displaying a composite image of visible light (VL) and infrared (IR) images of a target scene superimposed and blended, the medium comprising instructions for causing a programmable processor to:
detect a change in a camera parameter indicative of a desire to display the composite image with a first ratio of the amount of IR images to the VL images in the blended composite image;
display the composite image with the first ratio;
determine a lack of change in the camera parameter for a period of time; and
change the ratio of the composite image display to a second ratio after determining the lack of change.

30. The camera of claim 29, further comprising instructions to initially set the camera display to the first ratio.

31. The camera of claim 29, further comprising instructions to initially set the camera display to the second ratio.

32. The camera of claim 29, wherein the camera parameter is a focus position of optics associated with the IR images.

33. The camera of claim 29, wherein the camera parameter is a dedicated camera toggle switch.

34. The camera of claim 29, wherein the second ratio is the ratio being used immediately prior to the display of the composite image with the first ratio.

35. A camera with a computer-readable medium programmed with instructions for performing a method of mode switching a camera display, the camera display for displaying a composite image of visible light (VL) and infrared (IR) images of a target scene superimposed and alpha-blended in one of an analysis mode and a focus mode, the modes being particular ratios of the amount of VL images to the IR images in the alpha-blended composite image, the analysis mode alpha-blend ratio being relatively higher than the focus mode ratio and being appropriate for analyzing and visualizing the target scene, the focus mode alpha-blend ratio being appropriate for focusing at least one of the VL and IR images, the medium comprising instructions for causing a programmable processor to:
detect a change in a camera parameter indicative of desire for focus mode;
switch the camera display to the focus mode after detection of the change in the camera parameter; and
switch the camera display to the analysis mode a predetermined time after no detection of change in the camera parameter.

* * * * *